Nov. 13, 1956

J. L. LINDESMITH 2,770,415

READ-OUT AND RADIX CONVERSION APPARATUS
FOR ELECTRONIC COMPUTING APPARATUS

Filed Dec. 3, 1951

INVENTOR.
John L. Lindesmith,
BY
Fred N. Schwend
ATTORNEY.

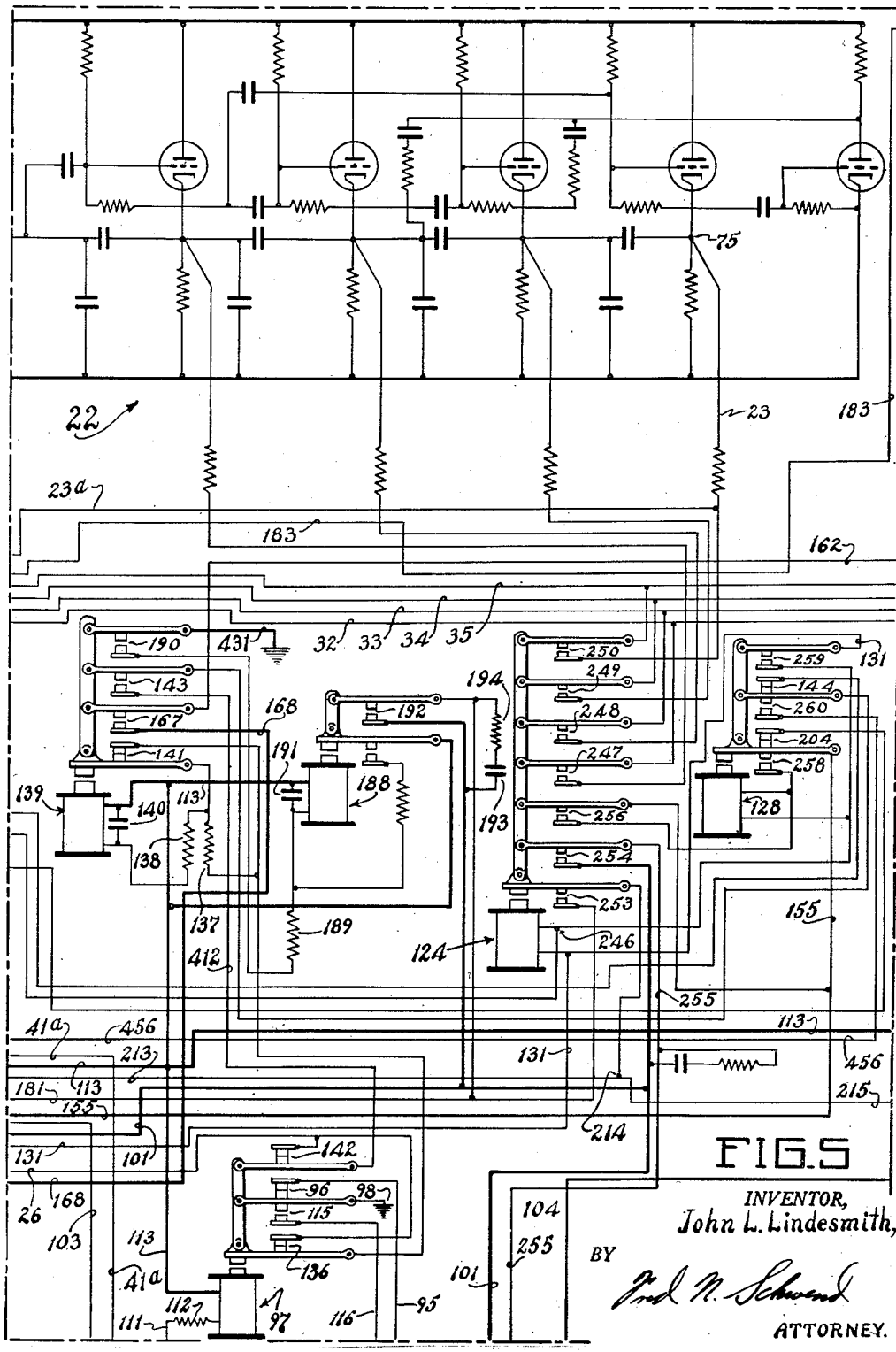

Nov. 13, 1956 J. L. LINDESMITH 2,770,415
READ-OUT AND RADIX CONVERSION APPARATUS
FOR ELECTRONIC COMPUTING APPARATUS
Filed Dec. 3, 1951 12 Sheets-Sheet 6
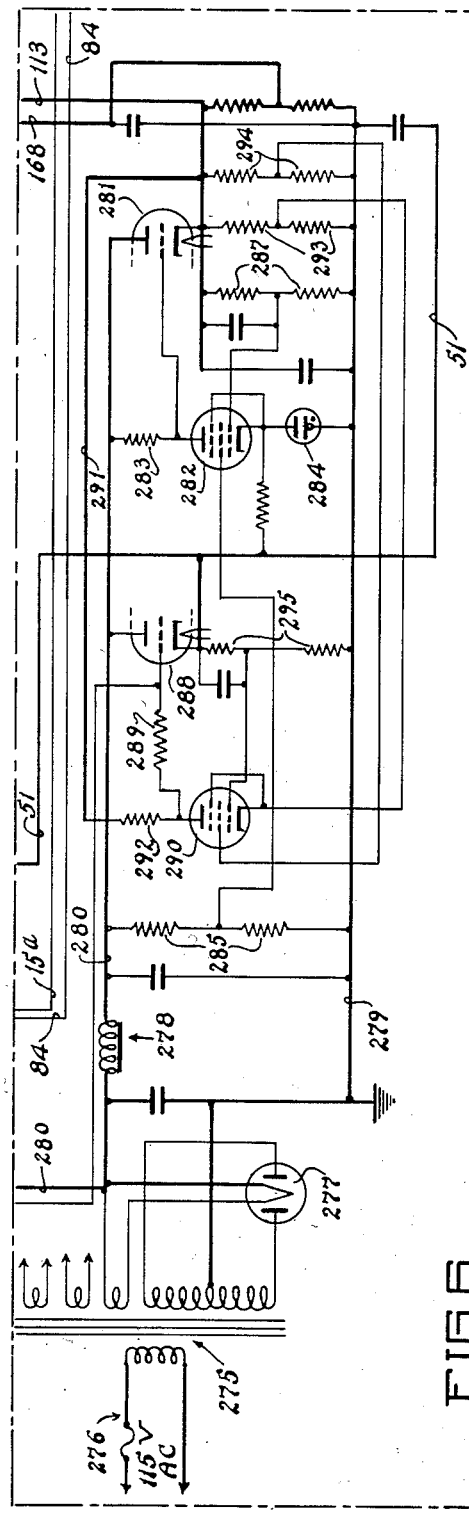
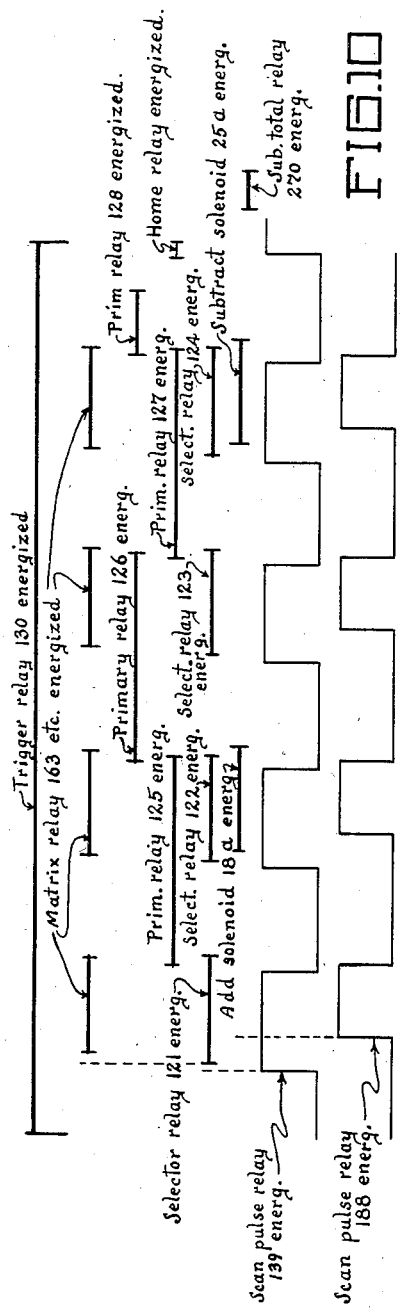
INVENTOR,
John L. Lindesmith,
BY
Fred N. Schward
ATTORNEY.

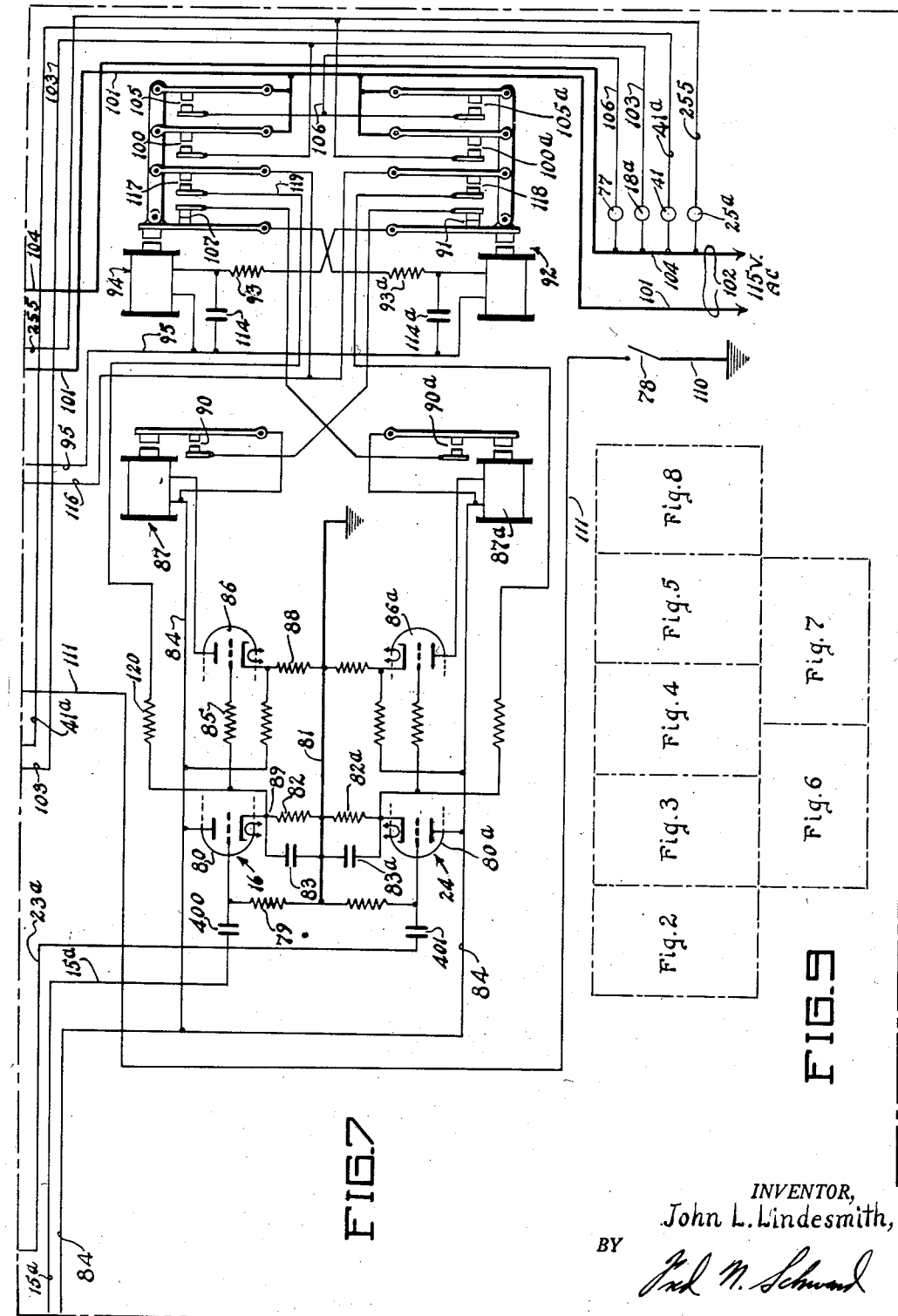

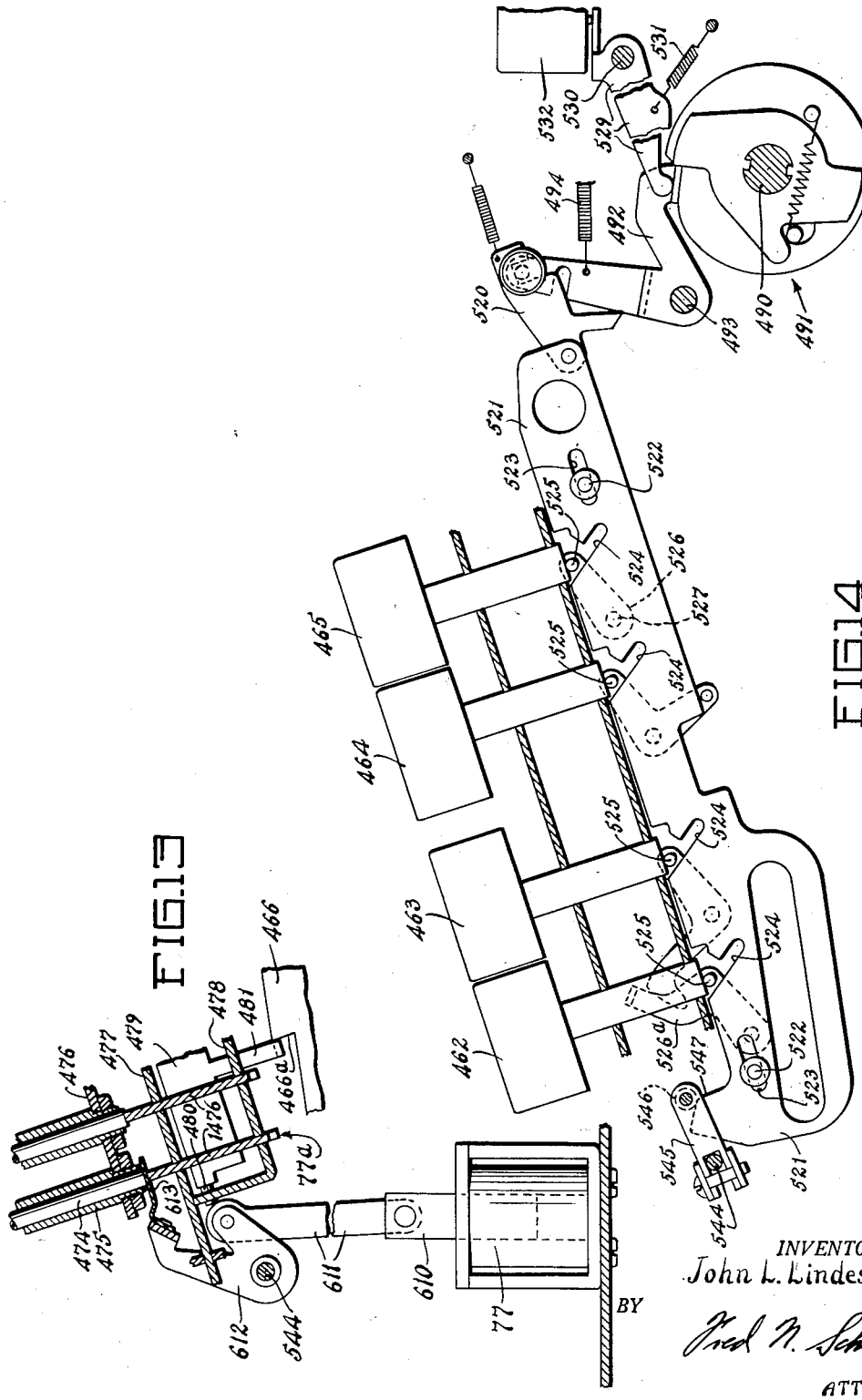

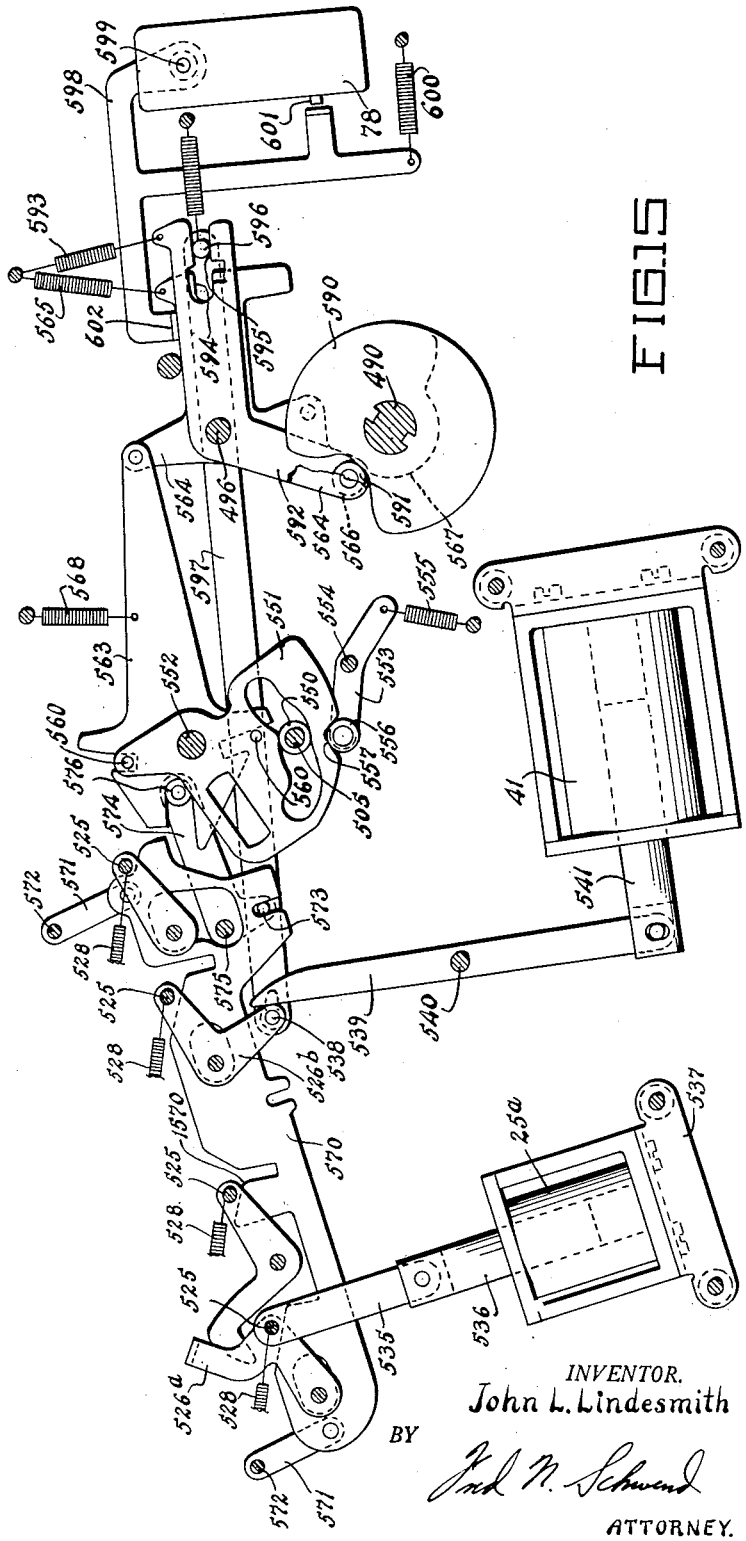

United States Patent Office 2,770,415
Patented Nov. 13, 1956

2,770,415

READ-OUT AND RADIX CONVERSION APPARATUS FOR ELECTRONIC COMPUTING APPARATUS

John L. Lindesmith, Sierra Madre, Calif., assignor to Clary Corporation, a corporation of California Application December 3, 1951, Serial No. 259,568

21 Claims. (Cl. 235—61)

This invention relates to electronic computing devices and has particular reference to systems for recording amounts accumulated by such devices.

Electronic computing devices are capable of handling data, generally in the form of impulses, at a considerably higher speed than mechanical computing machines. On the other hand, such mechanical machines are found to lend themselves more readily to the control of ancillary devices such as mechanisms for recording in visible form the factors and results of problems performed by the machine.

Generally speaking, such electronic computing devices either incorporate electronic counters for accumulating pulses representing factors or results or they utilize such counters for counting pulses to be totaled.

Although electronic counting units are available which are capable of counting by either the decimal numeral system or by other numeral systems, such as the binary system, the latter type has several advantages which make their use desirable. Primarily, such non-decimal type electronic counting units embody fewer electronic stages, i. e., tubes, resulting in simpler, less expensive and more compact units.

However, since numerical data is generally represented in the decimal system, certain difficulties arise in dealing with the non-decimal numeral system and it is therefore desirable to translate any non-decimal data obtained from such electronic counters into decimal data so that the values may be more readily comprehended and correlated with other data.

It therefore becomes a principal object of the present invention to utilize an electronic counter for counting impulses and to automatically record the total amount accumulated by such counter.

Another object of the invention is to provide a combined electronic counter and mechanical accumulator for counting impulses and to utilize the mechanical accumulator to control a printing mechanism for recording the totals of pulses so counted.

Another object of the invention is to provide an electronic-mechanical counting system wherein the electronic counter scales down the pulse count to a speed such that the mechanical counter is capable of counting such scaled down output and wherein the count accumulated in the electronic counter may be transferred at any time to the mechanical counter so as to register a total of the pulses counted.

Another object is to provide a novel system for translating data from a binary counter to a decimal accumulator.

Another object is to utilize the same translating system for translating data from different orders of a binary counter to different orders of a decimal accumulator.

The manner in which the above and other objects of the invention are accomplished will be readily understood on reference to the following specification when read in conjunction with the accompanying drawings wherein:

Fig. 1 is a general schematic view of a computing system embodying the present invention.

Figs. 2 to 8, inclusive, are circuit views which, when pieced together as indicated in Fig. 9, form a complete circuit diagram of the computing system.

Fig. 9 is a view showing the manner in which Figs. 2 to 8 are intended to be pieced together to form a complete circuit diagram of the computing system.

Fig. 10 is a timing chart showing the times of operation of various relays and solenoids of the computing system.

Fig. 13 is a fragmentary view taken substantially along the line 13—13 of Fig. 12, illustrating the solenoid and linkage for depressing the "one" amount key in the hundreds denomination of the machine.

Fig. 14 is a sectional elevational view illustrating the machine clutch and controls therefor and is taken along the line 14—14 of Fig. 12.

Fig. 15 is a sectional elevation view illustrating the accumulator positioning controls.

*General arrangement*

Figure 1:
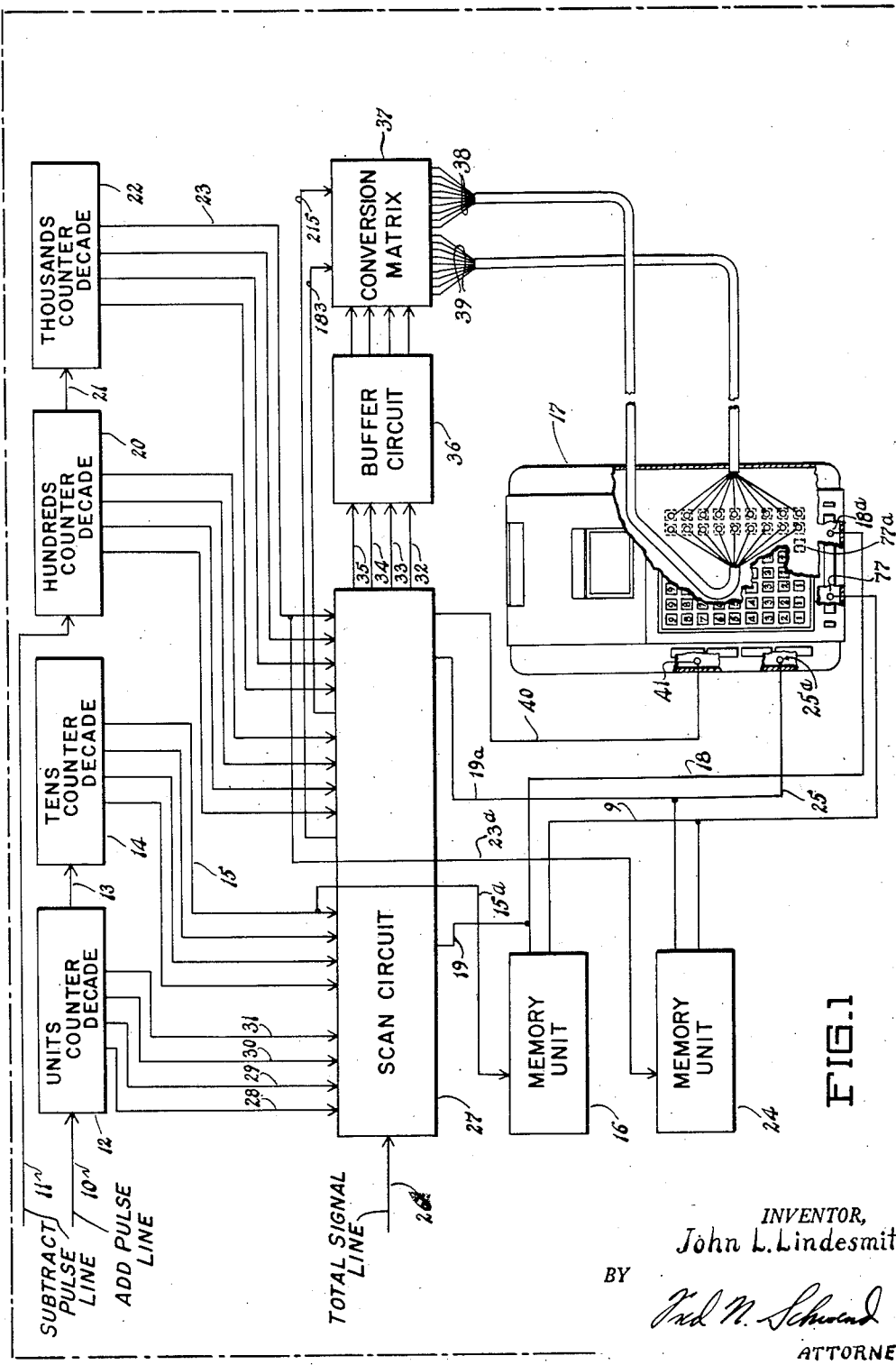

In order to first obtain a general understanding of the preferred embodiment of the invention, reference is had to the schematic layout of the various operating components shown in Fig. 1.

Impulses representing opposite senses are entered over lines 10 and 11. For example, add indicating pulses are entered over line 10 and subtract indicating pulses are entered over line 11. Such pulses may be entered at random rates entirely independent of each other, that is, they may be entered concurrently over the two lines or sequentially.

The pulses from line 10 are fed into a binary type counter unit or decade 12 having four stages of binary or scale-of-two type counter circuits and having the capability of accumulating from zero to nine and transferring a carry-over unit or pulse over line 13 upon accumulation of each tens pulse. The unit 12 is then automatically reset to zero preparatory to counting the next ten pulses.

A second binary counter unit 14 is connected to the line 13 to receive the tens carry-over pulses from the counter unit 12. The unit 14 is similar in all respects to that of 12 whereby the two decades have the capacity for counting from zero to 99.

The tenth pulse received by the counter unit 14, representative of the hundredth pulse received over line 10, is effective to return this unit to zero and to transmit a pulse in the form of a carry-over pulse along lines 15 and 15a to a one hundreds memory unit 16 where this count may be stored temporarily.

A computing machine generally indicated at 17 is provided having a keyboard, printing mechanism, and a mechanical accumulator to be described hereinafter. The latter machine is connected through suitable instrumentalities to the memory unit 16 by circuits indicated at 9 and 18. Circuit 9 is connected to a solenoid generally indicated at 77 associated with the "1" key located in the hundreds denomination or order of the keyboard while the line 18 is connected to a solenoid generally indicated at 18a operatively associated with "add" control instrumentalities of the machine. The machine 17 is cyclic in operation and upon the reception of a pulse from the unit 16, the machine 17 operates through one cycle to add the unit 1 into the hundreds denomination of the machine accumulator thus registering the value "100." Due to the fact that the counts are scaled down in a ratio of one hundred to one in the presently disclosed embodiment, pulses may be counted with this system at a speed one hundred times as fast as the machine 17 is capable of cycling. However, with the inclusion of additional electronic decade units, a greater scaling factor of any desired value may be obtained to enable the circuit to count pulses at correspondingly higher rates of speed relative to the speed of the machine, as will further appear hereinafter.

Subtract indicating pulses to be counted are entered over line 11 and fed into a first four stage electronic counter unit 20 and, upon accumulation of every tenth pulse, a carry-over pulse is entered through line 21 into a second counter unit 22, the counter units 20 and 22 being similar to the units 12 and 14. The one hundredth or overflow pulses emitted from the second counter unit 22 are entered through lines 23 and 23a into a second hundreds memory unit 24 where they may be stored temporarily or directly utilized to actuate the machine 17 as will appear hereinafter. A circuit 25 connects the latter memory unit to a solenoid generally indicated at 25a, operatively associated with "subtract" control instrumentalities in the machine, the latter being capable, upon receipt of a pulse from the memory unit 24, of causing the machine to perform one cycle and thereby subtract the unit 1 from the hundreds denomination of the machine accumulator.

Each memory unit 16 and 24 is capable of storing a one-hundred count therein in the event the machine is currently operating through a cycle for such a purpose as to enter the one-hundred count taken from the other memory unit, and suitable means are provided for clearing each memory unit as soon as the unit stored therein and representing the count of one hundred has been transferred to the machine.

Whenever it is desired to determine and print the total net amount accumulated by this system, a signal pulse is transmitted along a line 26 to an automatic scan circuit system 27. The latter, upon being set into operation, first scans the four stages of the first counter decade or unit 12 through lines 28, 29, 30 and 31 connected to respective ones of the four stages of this counter unit. Information received from these four lines is transferred through respective ones of data busses 32, 33, 34 and 35, and through buffer circuits generally indicated at 36, to a binary-to-decimal conversion matrix system 37 where the count in a binary form is changed to a decimal form by applying an energizing pulse along a correspondingly valued decimal line of a group 39 of nine lines connected to solenoids associated with keys "1" to "9" in the units order or denomination of the keyboard of the machine 17 so as to set the appropriate units key. The scan circuit system will next scan the four stages of the counter unit 14, transmitting the information thus found through appropriate ones of the busses 32 to 35 into the matrix system 37 and then through an appropriate one of nine decimal lines 38 connected to respective ones of key solenoids located in the tens order of the machine keyboard so as to set the appropriate tens key. At this time, a control pulse will be sent over a circuit 19 and aforementioned circuit 18 to actuate the add solenoid 18a to effect an additive entry of the amounts set up in the keyboard into the machine.

Thereafter, the scan circuit system will scan the lowermost decade subtract counter unit 20 and will transfer this amount through the data busses 32 to 35 and through the matrix system 37 into the units denominational order of the machine. The scan circuit system will then scan the condition of the second subtract counter unit 22 and will transfer the information thus found through the matrix system 37 to the tens denominational order of the machine 17.

Concurrently, a signal pulse will be transmitted over a circuit 19a and the foregoing circuit 25 from the scan circuit system to energize the subtract control solenoid 25a to effect a subtractive entry of the amounts now set up in the keyboard. Finally, the scan circuit will transmit a signal pulse through a circuit 40 to a solenoid 41 capable of actuating suitable instrumentalities within the machine 17, to cause the latter to sub-total and print the net amount registered on the machine accumulator.

*Counter decade units*

The four electronic counter decade units 12, 14, 20 and 22, are shown in detail in Figs. 2 to 5, inclusive. However, since these counter units are similar in circuitry and function, only the unit 12 will be described in detail.

The counter unit 12 comprises five tubes 45 to 49, inclusive, of the gaseous, cold cathode type, preferably of the type commercially available as No. 5823. The first four tubes 45 to 48 constitute the actual counting stages capable of counting in the binary or radix two system, whereby the tube stages represent the decimal values 1, 2, 4 and 8, respectively.

The cathode of each of the tubes 45 to 48 is connected to a ground line 50 through a resistor 43 of 33,000 ohms, while the anodes of the latter four tubes are connected directly to a plus 170 volt supply line 51. The tube 49, termed a reset tube, has its cathode connected directly to the ground line 50 while its anode is connected to the supply line 51 through a resistor 52 of 150,000 ohms.

A 470,000 ohm resistor 53 is placed in the cathode ignitor circuit of each of the tubes and cooperates with a 1 megohm resistor 1266 to normally positively bias the ignitor of tubes 45 to 48 to a point slightly below the firing point of the tube.

Normally, when the counter unit is in zero condition, all four tubes 45 to 48 are in a stage of conduction while the tube 49 is in a non-conductive state.

Add pulses to be counted are applied to the input conductor 10. These pulses are preferably of an amplitude of approximately 130 volts and 500 microsecond duration, and are transmitted simultaneously through a coupling capacitor 54 to the ignitor of tube 45 and through an RC delay circuit generally indicated at 55. The latter circuit includes a 4,700 ohm resistor 56, a similar resistor 57 and a .015 mfd. capacitor 58, all connected in series between the input line 10 and the associated tube cathode. A second capacitor 59 connects the resistor 56 to the ground line 50. By virtue of this delay circuit, such positive count pulse is first applied to the ignitor of tube 45 but since the latter tube is in a state of conduction at this time, the pulse will have no effect. Shortly thereafter, the same pulse is transmitted through the delay circuit 55 to raise the potential of the cathode of tube 45 sufficiently to render the tube non-conductive. This will leave the counter decade unit representing the binary term of "0001" equivalent to the decimal value "1."

Application of a second count pulse to the conductor 10 will be transmitted through capacitor 54 to the grid of tube 45, raising the grid potential sufficient to again cause conduction of the tube. As the voltage drop across this tube 45 is now decreased, the voltage drop across its resistor 43 will increase, applying a positive pulse simultaneously across a capacitor 61 and a second delay circuit 60, similar in all respects to the delay circuit 55. The capacitor 61 transmits the positive pulse to the grid of tube 46. However, since this tube is now already conducting, no change will be effected, but as the pulse is eventually transmitted by the delay circuit 60, the cathode of tube 46 will be raised sufficiently to extinguish the tube, leaving the counter unit in a condition representing the binary term "0010," equal to the decimal value "2." In the meantime a pulse will be transmitted through capacitor 1265 to the ignitor of tube 48 but since the latter tube is already conducting such positive pulse will have no effect on this tube.

Application of a third count pulse to the input conductor 10 will again have no direct effect upon the grid of the now conducting tube 45 but will be transmitted to the cathode thereof through the delay circuit 55, thus rendering the latter tube non-conductive to leave the unit in a condition representing the binary term "0011," equal to the decimal value "3."

The fourth count pulse transmitted by the conductor 10 will be applied to the grid of the now non-conducting tube 45, rendering the same conductive and the drop in potential across the tube will transmit a positive pulse through capacitor 61 to the grid of non-conducting tube 46, thereby likewise rendering the latter tube conductive. In like manner, the drop in potential through tube 46 will be applied as a positive pulse through a third delay circuit 62 to the cathode of conducting tube 47, raising the latter cathode to extinguish tube 47 and leaving the counter in a binary "0100" condition equal to the decimal value "4."

The fifth pulse applied to conductor 10 will merely render the now conducting tube 45 non-conducting and leave the counter in a binary "0101" condition. The sixth pulse will again render the tube 45 conducting and effect a transfer into tube 46 causing the latter to become non-conducting and leaving the counter unit in a binary "0110" condition. The seventh pulse will again render the tube 45 non-conducting in the usual manner leaving the counter in a binary "0111" condition.

The eighth pulse will render tube 45 conducting in the usual manner and the carry pulse operations resulting from the drop in potential therethrough will likewise render tubes 46 and 47 conductive, applying a positive potential through a fourth delay circuit 63 to the cathode of tube 48, extinguishing the latter and leaving the counter in a binary "1000" condition. The latter carry pulse transmitted by delay circuit 63 is also applied through condenser 66 to the ignitor of tube 49 causing the latter to fire. The drop in potential across tube 49 causes a negative pulse to be applied through line 49a and through capacitors 67, 67a and resistors 68 and 68a to the cathodes of tubes 46 and 47. However, since these tubes are both already conducting the negative pulses will have no effect on them.

The ninth pulse will merely render the tube 45 non-conducting, causing the counter to assume a binary "1001" condition.

The tenth count pulse will render tube 45 conducting and the consequent increase in potential of its cathode will be applied substantially simultaneously through the delay circuit 60 to the cathode of tube 46 and also through a capacitor 1265 to the grid of now non-conducting tube 48, causing the latter to conduct while the consequent increase in potential of the cathode of tube 48 will be transmitted through condenser 66 to fire tube 49.

Thus, the cathode of tube 46 is at this time held sufficiently negative by the feedback pulse from the anode circuit of tube 49 so that the resultant increase of potential at the cathode of tube 46 will be insufficient to extinguish this tube. Likewise, the cathode of tube 47 is held sufficiently negative by the feed-back pulse from the anode circuit of tube 49 to prevent the increase in potential of the cathode of tube 48 from increasing the potential of the cathode of tube 47 to the cut-off point. Thus, all tubes 45 to 48 will be conducting leaving the counter circuit in a cleared or binary "0000" condition.

As the positive potential is removed from the ignitor of tube 49, the latter returns to its non-conducting state due to the voltage drop across resistor 52.

Figure 3:
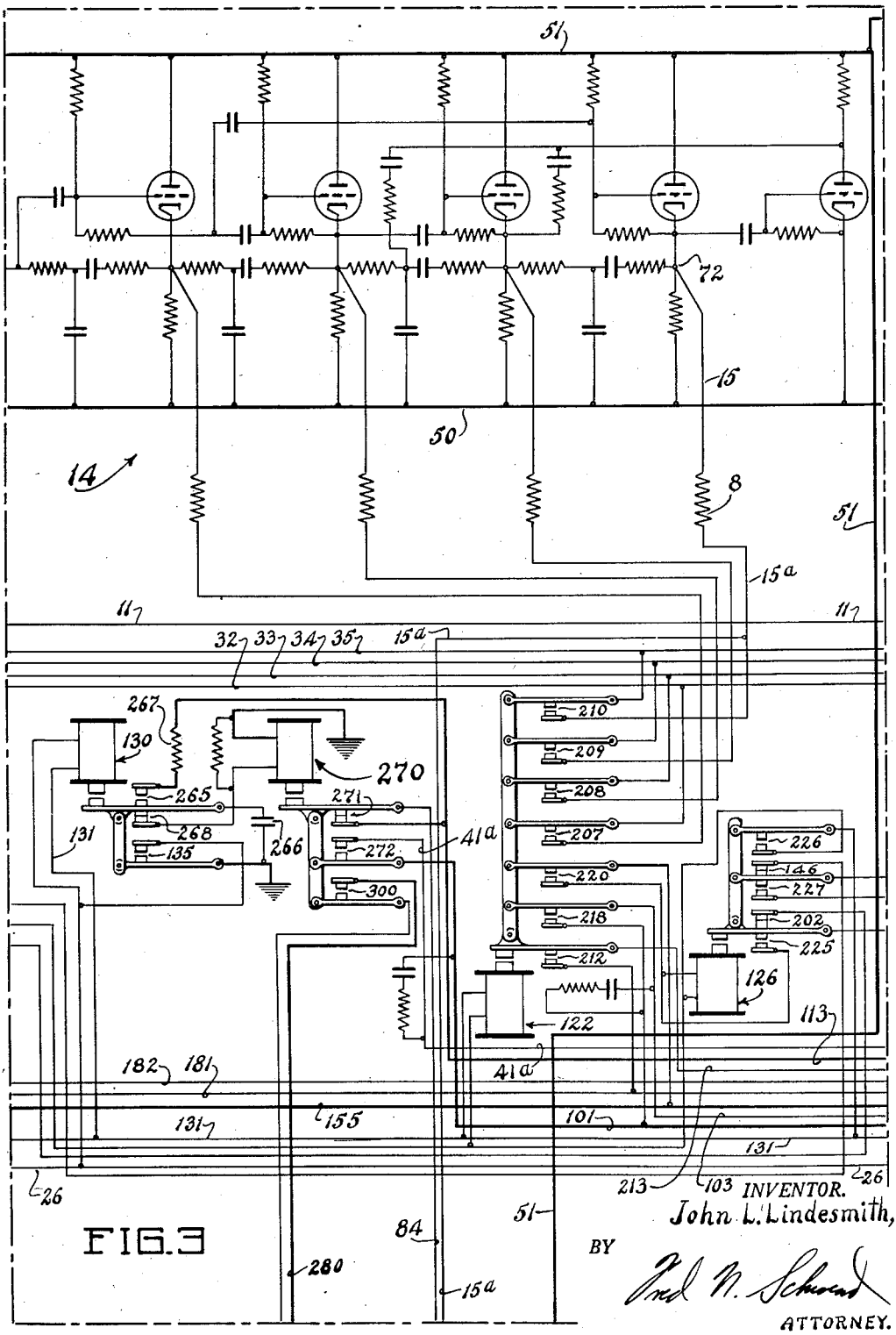
Figure 4:
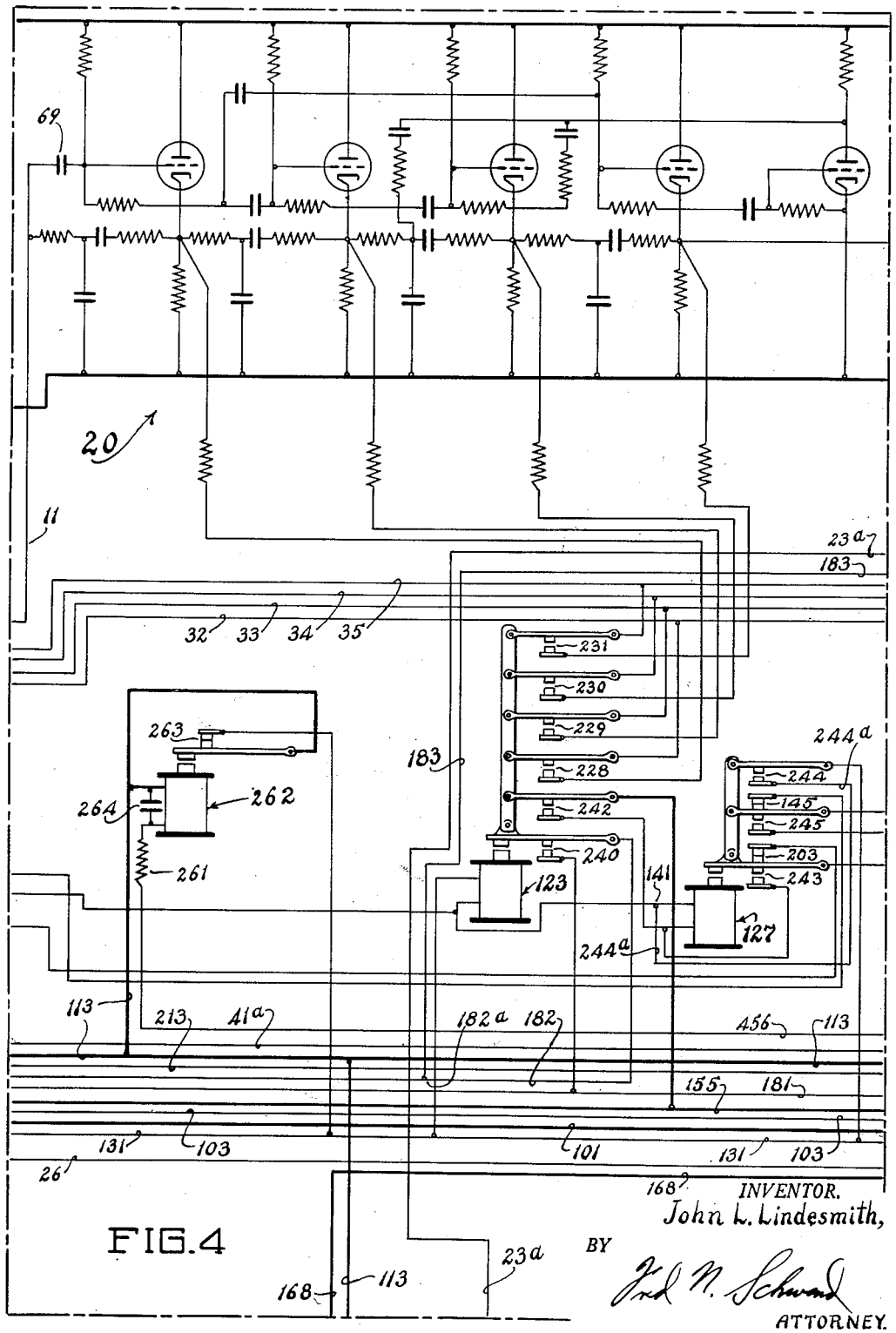

The rise in potential of the cathode of tube 48, occurring as an incident to registration of the tenth pulse, will also cause a positive carry-over or tens count pulse to be applied at point 70 to the input conductor 13 for the second binary counter unit 14 (Fig. 3).

The counter unit 14 (Figs. 1 and 3) accumulates a count in a binary sense in the same manner as the counter unit 12 and upon registration thereby of the decimal count of ten, a point 72, corresponding to point 70 (Fig. 2) and connected to the cathode of the tube representing the fourth stage of the counter, rises sharply in potential in response to the change of the tube in this stage to a conducting state. This change in potential forms a hundreds carry-over pulse and is applied through isolating resistor 8 of 100,000 ohms, conductors 15 and 15a and coupling capacitor 400 to the input of the memory unit 16 (Figs. 1 and 7) where it is transmitted to the computing machine 17 or temporarily stored as will be described hereinafter.

From the above it will be seen that at any instant the amount accumulated in the counter units 12 and 14 will be represented in a binary sense by the potentials appearing on the cathodes of the four counting stages in each counter unit.

First and second subtract decade counter units 20 and 22 (Figs. 4 and 5) function in precisely the same manner as the counter units 12 and 14 to accumulate a count of subtract pulses transmitted by the subtract pulse input conductor 11 and a coupling capacitor 69. A point 75 (Fig. 5), connected to the cathode of the last counting tube in unit 22 and corresponding to the point 72 (Fig. 3), will rise sharply in potential upon reception of the hundredth subtract pulse and accordingly a positive pulse will be transmitted along lines 23 and 23a and through capacitor 401 to the input of the memory unit 24 (Figs. 1 and 7) where the same will likewise be transmitted to the the machine 17 or temporarily stored as will appear in detail hereafter.

*Memory units*

As pointed out hereinbefore, the memory units 16 and 24 (Figs. 1 and 7) either transmit the information representing the value 100 immediately to the computing machine 17 or temporarily store the same. If the machine is at rest at the moment, the value 100 will be directly transmitted to the machine, actuating the solenoid 77 to depress the "1" key 77a (Figs. 1 and 13) in the hundreds denomination of the keyboard and likewise actuating the appropriate machine control solenoid 25a or 18a. However, if the machine is currently operating to enter a similar unit of the opposite sense, the unit will be stored until the machine completes its cycle and will then be transmitted to the machine.

The two memory units 16 and 24 are identical in structure and function and therefore only one will be described in detail, although reference will be made to both units in instances where inter-relations exist between the two. Referring to Fig. 7, and particularly to the add memory unit 16, the conductor 15a is connected through the aforementioned coupling condenser 400 of .01 mfd to the grid of one section 80 of an electron tube preferably of the 12AU7 type. The cathode of the latter section is connected to a ground line 81 through a parallel circuit comprising a resistance 82 of 3.9 megohms and a capacitor 83 of .5 mfd. The anode of section 80 is connected directly to a conductor 84 which is normally connected in a manner to be described hereinafter with a source of plus 260 volts potential. A resistance 79 of 680,000 ohms is connected in the grid-cathode circuit of section 80 and the net value of resistances 79 and 82 is sufficient to normally bias the grid of section 80 to substantially cut-off potential so that very little plate current will flow.

The cathode of section 80 is connected through a resistor 85 of 1 megohm to the grid of the second section 86 of the 12AU7 tube. The anode of the latter section is connected to the 260 volt supply conductor 84 through the coil of a relay 87. The cathode of section 86 is connected to the ground line 81 through a resistance 88 of 2,200 ohms which is also of sufficient value to normally bias the grid to substantially cut-off.

Insufficient anode current will normally flow through tube section 86 to energize the coil of relay 87. However, upon the transmission of a positive pulse through line 15a, the bias of the grid of section 80 will be overcome and this section rendered conductive thereby raising the potential at point 89 to apply a positive pulse across resistance 85 to the grid of tube section 86 thereby also rendering the latter section conductive to energize the coil of relay 87.

The time constant of the resistance 82 and capacitor 83 is such as to maintain the tube section 86 in the state of conduction for a period substantially greater than the length of time required for the computing machine to complete a cycle of operation notwithstanding the duration of the control pulse applied through line 15a.

Accordingly, relay contacts 90 of relay 87 will be closed, establishing a circuit from the 260 volt supply conductor 84, through contacts 90, normally closed contacts 91 of a relay 92 associated with the subtract memory unit 24, and resistance 93 to the coil of a control relay 94. The latter relay coil is connected to a conductor 95 which is connected through normally closed contacts 96 of a machine feedback relay 97 to a ground conductor 98.

It will thus be seen that upon reception of a one-hundred add pulse by the memory unit 16, the relay 94 will become energized providing control relay 92 associated with the subtract memory is at the moment de-energized, and relay 97 is likewise de-energized in response to the machine 17 being at rest, as will appear later.

Included in the contacts of relay 94 are normally open contacts 100 connected between one conductor 101 of a 115 volt power supply circuit 102 and a conductor 103. The latter is in circuit with the add control solenoid 18a (Figs. 1, 10 and 12) and a conductor 104 which completes the circuit 102. A second set of normally open contacts 105 of the relay 94 is connected between the conductor 101 and a conductor 106, the latter being in circuit with the solenoid 77 (associated with the number one key in the hundreds denomination of the keyboard) and the second power supply conductor 104. Thus, it will be seen that with the relays 92 and 97 de-energized, actuation of relay 94 will cause the machine to additively enter the value 100 into its accumulator. Also included in the relay 94 are normally closed contacts 107 provided in circuit between the coil of relay 92 and normally open contacts 90a of a relay 87a associated with the memory unit 24 and performing the same function as the relay 87 for the memory unit 16. Thus, upon energizing the relay 94 so as to close the contacts 100 and 105 to complete circuits through the "add" control solenoid 18a and the one-hundreds key actuating solenoid 77 to cause the machine to enter the unit 100 additively, the contacts 107 will open to prevent the relay 92 from becoming energized. Relay 87 will become de-energized as soon as the machine commences to operate, as will be described later on. However, if during such time that the relay 94 were energized, a pulse is received in the memory unit 24, the tube section 86a would be maintained in a conducting condition for an appreciable period due to the time constant of the parallel circuit comprising resistance 82a and capacitor 83a until the relay 94 became de-energized at which time control relay 92 would become energized, completing a circuit to the ground conductor 95 to close its normally open contacts 100a and 105a. Now, the normally closed contacts 91 of control relay 92 would open thus insuring that the relay 94 will be maintained de-energized during the succeeding machine cycle. The contacts 100a will now complete a circuit from the supply conductor 101, through conductor 107 to the subtract control solenoid 25a while the contacts 105a will simultaneously complete a circuit from the supply conductor 101, through conductor 106, and the one-hundreds key actuating solenoid 77 to the second supply conductor 104.

Upon operation of the computing machine 17, a normally open switch 78 will be closed thereby, establishing a circuit from a ground supply conductor 110, through conductor 111 (see also Fig. 5), resistance 112 and the coil of machine feedback relay 97 to a plus 260 volt supply conductor 113. The relay 97 will thus become energized to open the contacts 96 and thus de-energize whichever control relay 92 or 94 was previously energized. A capacitor 114 is connected across the coil of relay 94 and the time constant obtained by the resistance 93 and capacitor 114 thus holds the relay 94 energized for a short period following opening of the coil supply circuit by the machine feedback relay 97. A similar capacitor 114a is connected across the coil of relay 92 and cooperates with a resistance 93a in the same manner as capacitor 114 and resistance 93.

Means are provided to neutralize one or the other of the memory units 16 and 24 upon operation of the computing machine in response to a control by the respective memory unit. Normally open contacts 115 in the machine feedback relay 97 are connected in circuit with the ground conductor 98 and a conductor 116 to normally open contacts 117 associated with the memory unit 16 and normally open contacts 118 associated with the memory unit 24. Assuming the relay 94 to be energized, and the machine accordingly actuated to add the unit 100 therein, the switch 78 will be closed by the machine, energizing the machine feedback relay 97 to connect ground potential through contacts 115, conductor 116 and contacts 117 to a conductor 119 which, in turn, is connected through resistance 120 to the resistance 85 coupled to the grid of section 86. Consequently, a ground potential will be applied through resistors 120 and 85 to the grid of the latter section to render the same non-conductive and to discharge the condenser 83.

A similar action will occur upon operation of the machine in response to a subtractive entry of the unit 100 therein in order to neutralize the memory unit 24.

*Automatic scan circuit*

The automatic scan circuits 27 (Fig. 1) are rendered operative whenever it is desired to obtain a record of the net total of impulses registered by the binary counter units 12, 14, 20 and 22. The scan circuits are effective to automatically and sequentially scan the four counter units and transfer the information thus obtained through the buffer circuits 36 to the binary-to-decimal conversion matrix circuits 37 to set up the amount thus scanned in a decimal form in the appropriate orders of the keyboard of the computing machine 17 and to effect proper operation of the machine to eventually record the net total.

For this purpose, the scan circuits include four selector relays 121 (Fig. 2), 122 (Fig. 3), 123 (Fig. 4) and 124 (Fig. 5) associated with the counter units 12, 14, 20 and 22, respectively. The four selector relays are associated with four priming relays 125 to 128, inclusive, effective to sequentially transfer control from one of the selector relays to the next.

Operation of the scanning circuits is initiated by a trigger relay 130 (Fig. 3). The coil of the latter is connected between a 260 volt supply conductor 131 and the trigger conductor 26. Upon momentary closing of a switch 133 (Fig. 2) to effect operation of the scanning circuits, ground potential is applied to the conductor 26, completing a circuit through the coil of relay 130 to the 260 volt supply conductor 131 to energize the latter relay. Holding contacts 135 now become effective to apply ground potential to the ground side of the coil and thereby lock the relay in energized condition. Ground potential is thereby applied through conductor 26 to normally closed contacts 136 of the aforementioned machine feedback relay 97 (Fig. 5), completing a circuit through resistances 137 and 138, the coil of a scan pulse generator relay 139 to the 260 volt supply conductor 113, thereby energizing the relay 139.

A capacitor 140 is connected across the coil of relay 139 and this capacitor in combination with the resistance 138 effects a pulsing operation of the relay, the operating time of which is controlled by the time constant of the resistor 138 and capacitor 140, as long as the machine feedback relay is de-energized and the trigger relay 130 is locked in energized condition.

It will be noted that the resistance 137 is connected across normally closed contacts 141 of the relay 139 to increase the operate time of the relay.

As the relay 139 becomes energized, a circuit is completed through the now grounded conductor 26, through normally closed contacts 142 of the machine feedback relay 97, conductor 412, the now closed contacts 143 of scan pulse relay 139, normally closed contacts 144 of the last priming relay 128, normally closed contacts 145 of priming relay 127 (Fig. 4), contacts 146 of priming relay 126 (Fig. 3), and contacts 147 of priming relay 125 (Fig. 2), line 414, point 148, and the coil of the first selector relay 121 to the 260 volt supply conductor 131, energizing the latter coil.

The selector relay 121 will now close its contacts 150 to 153, connecting the data lines 28 to 31 (see also Fig. 1) from the cathodes of the tubes in the four stages of the first add binary counter unit 12 to the four data busses 32 to 35, respectively. Simultaneously, selector relay contacts 154 will close to complete a circuit from a ground conductor 155, through the coil of relay 125, point 148 and the coil of relay 121 to the supply conductor 131, leaving both the selector relay 121 and the priming relay 125 associated with the counter unit 12 energized.

Figure 2:
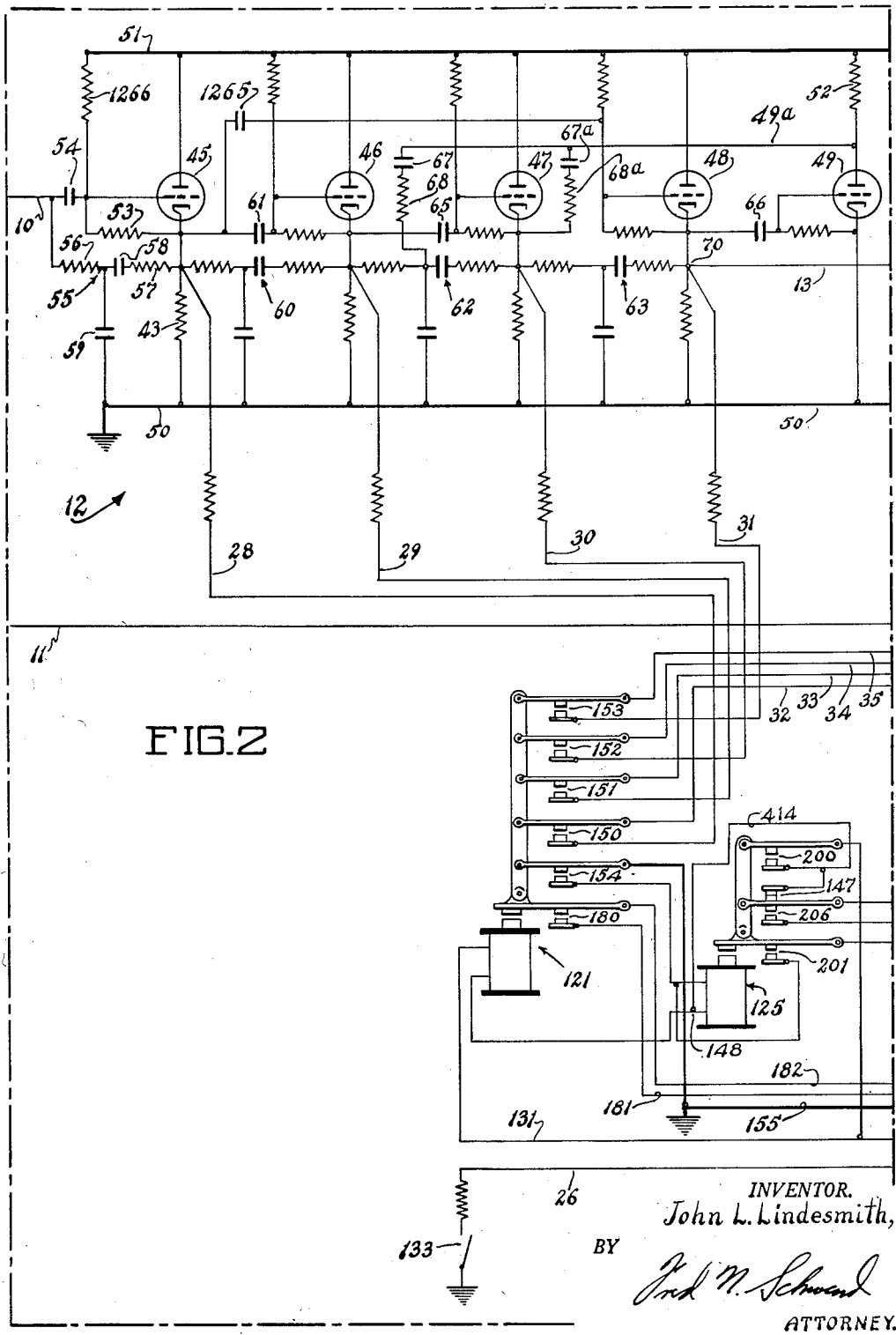

The data busses 32 to 35 are connected through resistors like resistor 157 (Fig. 8) to the grids of respective ones of buffer tubes 158 to 161 comprising the buffer circuits 36 (Fig. 1). The latter are of the gaseous, cold cathode type similar to the tubes 45 to 49 (Fig. 2).

The anodes of tubes 158 to 161 are connected to an anode supply conductor 162 through the coils of matrix relays 163, 164, 165 and 166, respectively. The conductor 162 is connected through normally open contacts 167 of the scan pulse generator relay 139 to a 210 volt supply conductor 168. The cathodes of the various tubes 158 to 161 are connected to a ground conductor 169 and the grid of each tube is positively biased to a point just below its cut-off potential by a cathode grid resistor like resistor 170.

The scan pulse relay contacts 167 are closed, due to energizing of relay 139, at the time data is applied to the data busses 32 to 35. Therefore, conduction will occur in those tubes 158 to 161 whose data busses receive positive potentials from the corresponding stages of the counter unit 12. Thus binary "0" representations will manifest themselves by conduction of the respective tubes and energization of the respective ones of the matrix relays 163 to 166, while binary "1" representations will manifest themselves by de-energization of the respective relays.

The matrix relays 163 to 166 include varying numbers of double throw or single throw switch contacts effective in different combinations to convert a value represented in a binary form by the various matrix relays to a decimal amount by completion of a circuit through one of the nine lines included in the bundle 38 or 39 (Figs. 1 and 8) whereby the corresponding decimal amount may be set up in the tens or units denominations, respectively, of the keyboard of the computing machine.

Closing of contacts 180 (Fig. 2) upon energization of the first selector relay 121 will have established a circuit from conductor 181, which at the moment will be assumed to be connected to the power supply conductor 101 of the power supply circuit 102 (Fig. 7), through conductor 182, point 182a and conductor 183 to switch arm 184 (Fig. 8) of the matrix relay 166. Thus, at this time, if the matrix relay 166 is energized, contacts 185 will be closed, completing the circuit through conductor 186 and through various ones of the matrix relay contacts to the appropriate one of the bundle of lines 39 connected to respective key units denomination actuating solenoids, like the solenoid generally indicated at 420, which solenoids are connected to the power line 104 to complete the circuit through the selected key solenoid. On the other hand, if the matrix relay 166 were de-energized, as illustrated, the circuit would be completed through switch arm 184, contacts 187 and through various other matrix relay contacts, depending upon the particular relays 163 to 166 which have been energized, to the appropriate key solenoid.

The relay 163 controls two slave relays 425 and 426 causing the latter to become energized as the relay 163 is energized. For this purpose, the coils of relays 425 and 426 are connected in series with each other and in circuit between the 260 volt supply line 113 and contacts 427 of relay 163 to the ground line 169.

Considering an example of operation of the binary-to-decimal matrix relay system, assume that a binary "0110" condition exists in the counting unit 12, resulting in the matrix relays 163, 166, 425 and 426 becoming energized, and the relays 164 and 165 left de-energized. In such case, a circuit will be completed, as above noted, through the switch arm 184, contacts 185, conductor 186, contacts 428 of relay 165, 429 of relay 164, 430 of relay 163 and the key solenoid for the number "6" key in the units order of the machine.

The key solenoids of the computing machine require considerable current for operation and to reduce arcing and its accompanying deleterious effects on the contacts of the relays 163 to 166, provision is made to supply this current after the selected ones of the relays 163 to 166 have been energized and their contacts closed. For this purpose, a scan pulse delay relay 188 (Fig. 5) is provided. The coil of the latter relay is connected in circuit, one side with the 260 volt supply conductor 113, and on the other side with resistance 189 and normally open contacts 190 of the scan pulse relay 139. Thus, as the relay 139 becomes energized, the contacts 190 will complete a circuit from a ground line 431 to the coil of relay 188. However, a capacitor 191 connected across the coil of the latter relay will cooperate with resistance 189 to delay energization of the relay 188 for a definite period following the energization of relay 139.

Normally open contacts 192 of the delay relay 188 are provided in circuit between the aforementioned conductor 181 and the supply conductor 101 so that the completed circuit through the contacts of selected relays 163 to 166 will not be made until the latter have been energized and their contacts closed. A capacitor 193 and resistance 194 are in series connected across the contacts 192 tending to quench any arc occurring thereacross.

The scan pulse relay 139 determines the speed at which sequential stepping of control or scanning from one counter unit to the next takes place, permitting the single set of buffer tubes 158 to 161 and decimal conversion relay circuits to be utilized to transfer the binary information from the four counter units to the machine. Obviously, expansion of the system to include greater numbers of counter units could be accomplished by using the same buffer and conversion circuits.

It will be recalled that the first selector relay 121 will be held energized as long as the scan pulse relay 139 is energized to hold the contacts 143 thereof closed and the machine is not operated to energize the machine feedback relay 97 and open its contacts 142. This period of energization of relay 139 is sufficient to enable the matrix relays 163 to 166 to effect proper distribution of data to the computing machine. However, when the pulse relay contacts 143 are next opened by de-energization of relay 139, ground potential applied to contacts 147 of priming relay 125 through contacts 146 of priming relay 126, 145 of priming relay 127, 144 of priming relay 128, said contacts 143, conductor 412, contacts 142 of machine feedback relay 97 and the now locked trigger relay 130, will be removed from the point 148 (Fig. 2) and a new circuit will be established from the 260 volt supply line 131, through coil of relay 121, point 148, coil of priming relay 125 and the now closed contacts 154 to the ground conductor 155, thus retaining the selector relay 121 energized and also energizing the priming relay 125. Now, contacts 200 of relay 125 will establish a circuit from the supply line 131 to point 148 to effectively short out the relay 121, de-energizing the latter. Simultaneously, a new circuit will be established from point 148 through the coil of priming relay 125, contacts 201 of relay 125, contacts 202 of priming relay 126, 203 of priming relay 127, and 204 of priming relay 128 to the ground conductor 155, leaving priming relay 125, alone, energized.

As the pulse relay 139 becomes energized the second time, the contacts 143 thereof will again become effective to apply ground potential from the now closed trigger relay contacts 135, conductor 26, contacts 142 of machine feedback relay 97, conductor 412, said contacts 143, contacts 144 of priming relay 128, 145 of priming relay 127, 146 of priming relay 126 to now closed contacts 206 of priming relay 125, establishing a circuit through the coil of relay 122 to the supply conductor 131. The relay 122 will now become energized to close contacts 207, 208, 209 and 210, thereof, thereby connecting the cathodes of the tubes in the four stages of the second binary add counter unit 14 to respective ones of the data busses 32 to 35.

Concomitantly with the latter energization of relay 139, its contacts 167 will again complete a circuit from the power supply conductor 168, through line 162 to different ones of the matrix relays 163 to 166, which at this time are selected under control of the different stages of the counter unit 14.

Shortly thereafter delay relay 188 will become energized to apply power from conductor 101, through the delay relay contacts 192 to conductor 181.

As the pulse relay 139 again de-energizes, its contacts 143 will remove ground potential from the circuit including contacts 144, 145, 146, and 206 and thus from the coil of relay 122. However, at this time a new circuit is completed from the ground line 155, contacts 220, the coil of priming relay 126 and coil of selector relay 122 to the supply conductor 131, thereby energizing the relay 126. Consequently, at this time the three relays 122, 125 and 126 are energized.

In the meantime, energization of relay 122 will have caused its contacts 212 to complete a circuit from the conductor 181 which now has power applied thereto, conductor 213, point 214, and conductor 215 to the "tens" distributing switch contact 216 which will apply current through various selected matrix relay contacts, depending on the particular combination of relays 163 to 166 which have been energized, to thereby energize an appropriate one of nine lines 38 connected to nine corresponding key solenoids in the tens order of the machine keyboard.

Assuming, for example, that a binary "1001" condition exists in the counting unit 14, the matrix relays 164 and 165 would be energized and the relays 163, 166, 425 and 426 would be de-energized. In such case, a circuit would be completed through switch arm 216, as noted above, through contacts 450 of relay 166, 451 of relay 426, and the key solenoid 452 for the number "9" key in the tens order of the machine.

Likewise, contacts 218 of selector relay 122 will complete a circuit from the power supply conductor 101, through conductor 103 to the add control solenoid 18a to cause an adding operation of the machine to enter into its accumulator the amounts set in the units and tens orders of the keyboard. This circuit is represented generally in Fig. 1 by the coextensive lines 15a and 19.

Now, as the machine operates, it will close the normally open switch 78, energizing the machine feedback relay 97, as described before, to open its contacts 136 and thus disable the scan pulse relay 139 indefinitely until the machine comes to rest at the end of its cycle.

As an incident to energization of priming relay 126 (Fig. 3), its contacts 225 and 226 will establish a new circuit from supply conduit 131, contacts 226, coil of priming relay 126, its contacts 225, 203 of priming relay 127, and 204 of priming relay 128 to the ground conductor 155. Since positive potential is applied to both sides of the coil of relay 122, the latter will be effectively shorted out and will become de-energized leaving only the priming relays 125 and 126 energized.

Also, as an incident to energization of relay 126, its contacts 202 are opened, breaking the circuit through contact 201 of priming relay 125 and its coil so that the latter relay will also become de-energized.

Upon the next succeeding energization of pulse relay 139, its contacts 143 will again establish a circuit from the grounded trigger line 26, through normally closed contacts 142 of machine feedback relay 97, through contacts 144 of priming relay 128, 145 of priming relay 127, through the now closed contacts 227 of relay 126 and the coil of selector relay 123 to supply conductor 131, thereby energizing relay 123 to close its contacts 228 to 231 so as to connect the cathodes of the tubes in the first subtract counter unit 20 to the data busses 32 to 35, respectively.

Simultaneously, contacts 240 of relay 123 will establish a circuit from the scan pulse delay relay contacts 192, conductor 181, point 182a to conductor 183 to subsequently apply power to the circuit distributing switch arm 184 of matrix relay 166 and thus apply power through the selected matrix switch contacts to the appropriate key solenoid in the units order of the keyboard.

As the pulse relay 139 again de-energizes, the circuit from the grounded trigger line 26, through contacts 144 of priming relay 128, 145 of priming relay 127, 227 of priming relay 126, and coil of relay 123 is broken, which would otherwise de-energize the latter relay. However, a circuit through relay 123 is now established through contacts 242 of the latter relay from the ground conductor 155, through the coil of priming relay 127, point 141 and the coil of relay 123 to the supply conductor 131, thus energizing relay 127 and retaining selector relay 123 energized.

Contacts 243 and 244 of relay 127 are now closed, establishing a circuit from the ground line 155, through contacts 204 of relay 128, through the coil of relay 127, conductor 244a, and contacts 244 thereof to supply conductor 131 thus effectively shorting out the coil of relay 123 to de-energize the latter.

Also, since the contacts 203 of relay 127 are now opened, the circuit through contacts 225 of relay 126 and through its coil is broken and the latter relay becomes de-energized leaving only priming relay 127 in energized condition.

Now, upon subsequent reclosing of the scan pulse relay 139, a circuit will be established from the grounded trigger line 26, through contacts 142 of machine feedback relay 97, contacts 143 of scan pulse relay 139, through contacts 144 of relay 128, the now closed contacts 245 of relay 127, point 246, and the coil of selector relay 124 to supply conductor 131, energizing the relay 124 to close its contacts 247 to 250 and thus connect the cathodes of the counter tubes in the counter unit 22 to the data supply busses 32 to 35. In the usual manner, the contacts 167 of pulse relay 139 will supply anode current to selected ones of the buffer tubes 158 to 161 so as to energize their respective matrix relays 163 to 166. Shortly thereafter, a circuit will be completed through the contacts 192 of the scan pulse delay relay 188, from conductor 101, through now closed contacts 253 of relay 124, point 214, and conductor 215 to apply current through the switch contact arm 216 through the selected matrix contacts and thence to the appropriate key solenoid in the tens order of the computing machine. Also, a circuit is completed by contacts 254 of relay 124, from the power supply conductor 101 of the power circuit 102, through conductor 255 to the subtract control solenoid 25a, causing the machine to operate through a subtract cycle during which time the scan pulse relay 139 will be de-activated by the machine feedback switch 78 in the manner described before. The latter circuit is represented generally in Fig. 2 by the coextensive lines 19a and 25.

Again, as the scan pulse relay is de-energized, its contacts 143 open the circuit through contacts 144 of priming relay 128, 245 of priming relay 127, point 246 and coil of relay 124, and a new circuit is established through contacts 256 of relay 124, from ground conductor 155, through the coil of relay 128, point 246, and coil of relay 124 to the supply conductor 131, leaving relays 124 and 128 energized.

As contacts 258 of relay 128 close, a new circuit is established from the ground conductor 155, through contacts 258 and coil of relay 128, contacts 259 of relay 128 to supply conductor 131. The latter circuit, applying a positive potential to point 246, will effectively short out the coil of relay 124 so that the latter will de-energize.

As contacts 204 of relay 128 now open, the circuit from the ground conductor 155 through the latter contacts and through contacts 243 of relay 127 is broken to de-energize relay 127, leaving relay 128 solely energized.

As the machine comes to rest at the completion of its subtract cycle, the switch 78 will again open, de-energizing machine feedback relay 97 and enabling the scan pulse relay to resume operation. As the contacts 143 now close, they establish a circuit from the grounded trigger line 26, contacts 142 of relay 97, through contacts 260 of relay 128, conductor 456, resistance 261 and the coil of a home relay 262 to the 260 volt conductor 113, thus energizing this coil to break normally closed contacts 263, thereby removing positive potential applied to the supply conductor 131 by the conductor 113. A condenser 264 is connected across the coil of relay 262 and the latter cooperates with resistance 261 to hold the relay 262 energized for a definite period after the relay 128 is de-energized by removal of potential from the conductor 131.

Simultaneously with opening of the contacts 263, the circuit through trigger relay 130 is broken by removal of potential from conductor 131. It will be recalled that the trigger relay 130 has been locked in energized condition throughout the preceding chain of operations of the scanning circuit.

It must be pointed out at this point that contacts 265 of trigger relay 130, which were previously closed, permitted a charge to be applied from the 260 volt supply line 113 to a condenser 266 through resistance 267 thereby charging the latter. Now, as contacts 268 close in response to de-energization of the relay 130, the condenser discharges through the latter contacts and through the coil of a sub-total relay 270 to ground to energize the latter relay. Contacts 271 of the latter open to break the circuit between the supply conductor 113 and the conductor 84 to the anode circuits of tube sections 80, 86, 80a and 86a (Fig. 7) and relays 87, 87a of the memory units 16 and 24, preventing the possibility of any transient impulses being surreptitiously fed to such memory units due to operation of any of the relays and other electrical components at this time.

Contacts 272 of relay 270, upon closing, connect the power supply conductor 101 of power circuit 102 (Fig. 7) to conductor 41a so as to establish a circuit through the sub-total operating solenoid 41 (Figs. 1 and 8), thereby initiating a sub-totaling operation of the computing machine to print the net total remaining in the accumulator at this time.

In order to more clearly understand the sequence of operation of the various selector and priming relays, attention is directed to the timing diagram of Fig. 10 wherein the energization times of the various relays are shown in correlation with each other.

*Power supply*

The aforementioned circuit is supplied with current of three different voltages from a power supply circuit shown in Fig. 6.

A power transformer 275 supplies current from a power supply source 276 to opposite sides of a duo-diode power tube 277 and direct current derived from the latter is applied across a filter unit generally indicated at 278 connected between a ground conductor 279 and a high voltage supply line 280.

A voltage regulator tube 281 has its anode connected to the line 280 and its cathode connected to the aforementioned 260 volt supply conductor 113. The grid of tube 281 is connected to the anode of a regulator amplifier tube 282, the anode of which is connected to the high voltage conductor 280 through a resistance 283. The cathode of the latter tube is connected to ground through a neon tube element 284 of the OB2 type having a fixed resistance value. The screen grid of the latter tube derives its voltage from a voltage divider network 285 connected between the supply conductor 280 and the ground conductor 279 while the control grid of the latter tube is connected to a voltage divider network 287 connected between the 260 volt supply conductor 113 and the ground conductor 279. Thus, variations in voltage in line 113 is reflected through the network 287 to the grid of the regulator amplifier tube 282 and the corresponding fluctuations in potential drop across the resistance 283 is applied to the grid of the regulator tube 281 to stabilize the voltage applied to conductor 113.

A second voltage regulator tube 288 is provided for the 170 volt supply conductor 51, the latter tube having its anode connected to the supply conductor 280 and its cathode connected to the conductor 51. The grid of regulator tube 288 is connected through a resistance 289 to the anode of a regulator amplifier tube 290 which derives its anode supply voltage from the 260 volt supply line 113 through conductor 291 and resistor 292. The cathode of tube 290 is connected to a voltage divider network 293 provided between the 260 volt conductor 113 and the ground conductor 279. The screen grid of tube 290 is connected to an additional voltage divider 294 extending between the conductor 113 and ground conductor 279 while the control grid is connected to a voltage divider network 295 extending between the cathode of regulator tube 288 and ground line 279. Consequently, any voltage variations found in 170 volt conductor 51 are reflected through the voltage divider 295 to the control grid of the amplifier tube 290, and the corresponding variations in voltage drop across the resistance 292 are impressed upon the grid of the regulator tube 288 to stabilize the voltage appearing on supply line 51.

*Counter unit erase control*

It is necessary to reset the various counter units 12, 14, 20 and 22 to zero indicating condition following a scanning operation and, accordingly, means are provided under control of the sub-total relay 270 to return the four counting tubes of each counter unit like 45 to 48, inclusive, to conducting condition if they are not already in that condition.

For this purpose, the sub-total relay 270 is provided with normally open contacts 300 connected between the supply line 280 (Fig. 6) of the power supply circuit and the grid of the regulator tube 288 for the 170 volt supply conductor 51. Consequently, when the relay 270 is energized to initiate a sub-total operation of the machine, the contacts 300 will apply the full potential of line 280 to the grid of tube 288, causing the potential of the cathode thereof to rise and thus apply increased potential to the conductor 51. This rise in potential, being applied to the anodes of all of the counter tubes, is sufficient to cause conduction thereof regardless of the bias applied to their respective grids.

Computing machine—General

The computing machine, generally indicated at 17 in Fig. 1, and illustrated in Figs. 11 to 15, is basically similar to that found in the well known Clary adding machine which is disclosed and claimed in the co-pending application of R. E. Boyden, S. N. 582,553, filed March 13, 1945. The particular accumulating mechanism is disclosed in detail and claimed in the patent to E. P. Drake, No. 2,472,696, issued on June 7, 1949.

Since the basic structure of the machine is disclosed in the above noted application and patent and as found in the commercially available Clary adding machine, only those portions thereof which relate to the present invention will be disclosed in detail. Reference is had to said application and patent for disclosure of the complete machine including mechanisms not specifically disclosed herein. However, it is to be understood that the invention is not limited to the particular machine disclosed.

The machine includes a series of banks with amount keys 460 on which amounts to be entered into the machine may be set. In addition to the amount keys is a series of depressible control bars including an add bar 461 (Figs. 11 and 12), a subtract bar 462 (Fig. 14), a non-add bar 463, a sub-total bar 464 and a total bar 465. The latter bars are effective upon depression to cause operation of the machine to perform the respective functions controlled by the bars. Also, as was noted previously and as will be described in detail hereafter, the add, subtract and sub-total bars are provided with solenoids located in the general circuit whereby they may be automatically depressed during operation of the system.

Keyboard

The keyboard is of the flexible type and each amount key 460 when depressed serves as a stop to limit the movement of an aligned drive rack 466 which both drives the accumulator, generally indicated at 467, to enter therein a value corresponding to the value of a depressed key, and also set a printing mechanism, generally indicated at 468, to print the set value.

Each of the keys 460 comprises a keytop 470 of plastic and a keystem 471 guided in aligned slots formed in a pair of spaced plates 472 and 473 rigidly mounted on the frame of the machine in a manner not shown.

Figure 12:
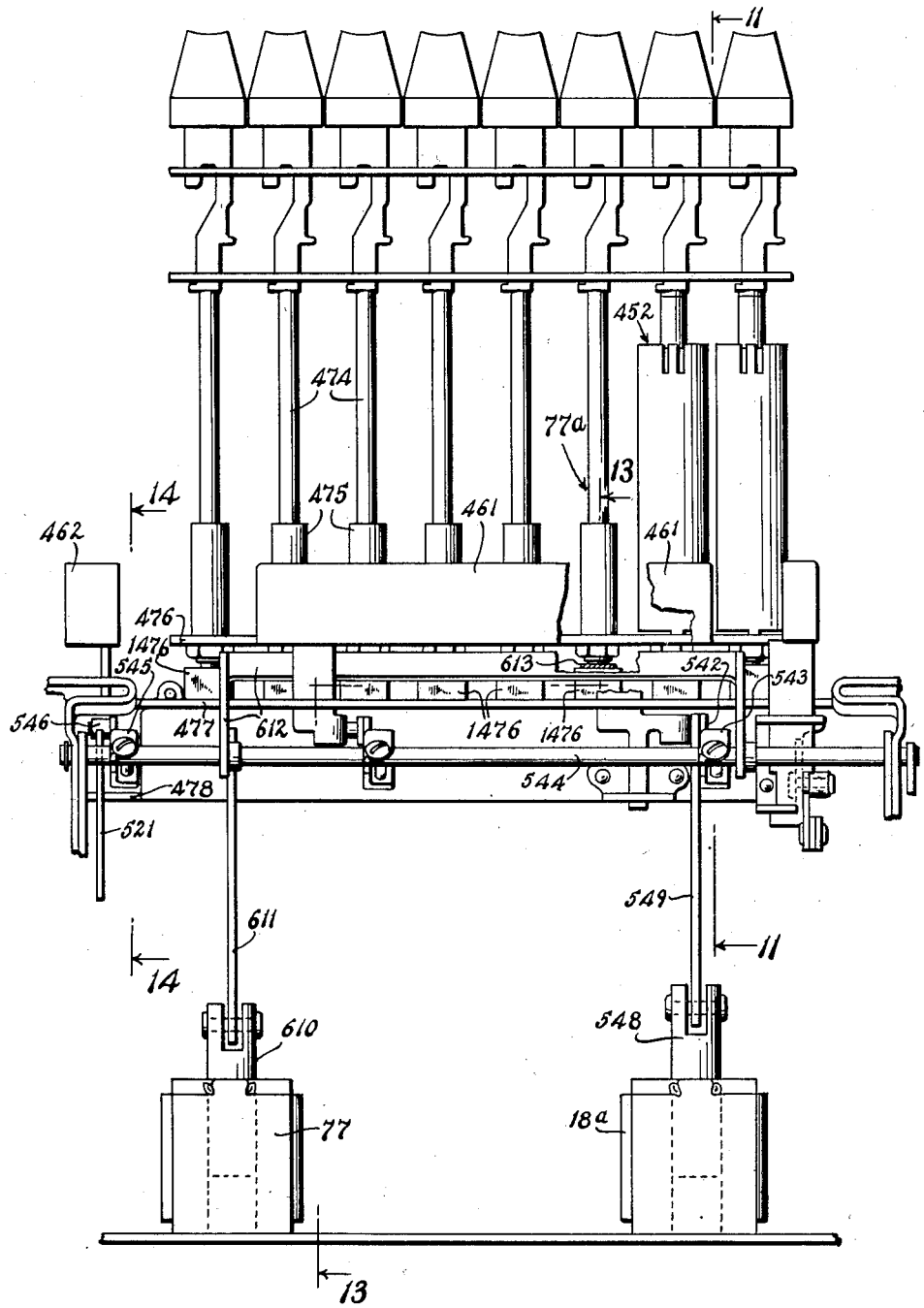
Fig. 12 is a front view of the machine and is taken in the direction of the arrow 12 of Fig. 11.

In all but the two lowermost denominations, i. e., the two banks of keys to the right in Fig. 12, the stems of keys 460 rest on rods 474 slidable in bushings 475 fastened to a plate 476 which is suitably secured in a manner not shown to the machine framework. The rods 474 rest on sub-keystems 1476 guided in aligned slots formed in key support plates 477 and 478. The latter plates are suitably secured in a manner not shown to the machine framework.

Spring means (not shown) are provided to individually urge the sub-keystems 476, and consequently the amount keys, into raised positions. However, means are provided for locking the keystems in depressed positions and for releasing any depressed key. For this purpose, each sub-keystem 1476 is provided with a cam lobe (not shown) formed thereon which, when the key is depressed, rocks a locking bail 479, pivoted at either end thereof by trunnion bearings 480. At the end of a stroke, the cam lobe on the key passes below the bail enabling the latter to retract partially under the urge of a spring (not shown) to a position where it latches the keystem depressed in the path of an associated shoulder 466a on the rack 466. The various shoulders 466a are so spaced relative to their associated keystems that the rack will advance a number of increments equal to the value of the depressed key before being arrested.

A zero stop 481 is formed on each locking bail 479 and when no key 460 in that order is depressed, the bail of that order will be spring held in an extreme inward rocked position where the zero stop 481 will be located directly in front of one of the shoulders 466a of the associated rack, thereby preventing any substantial movement of the rack during subsequent phases of operation of the machine.

However, when any amount key is depressed, the bail will be rocked outward sufficiently to retain the associated zero stop out of the path of the aligned rack.

Figure 8:
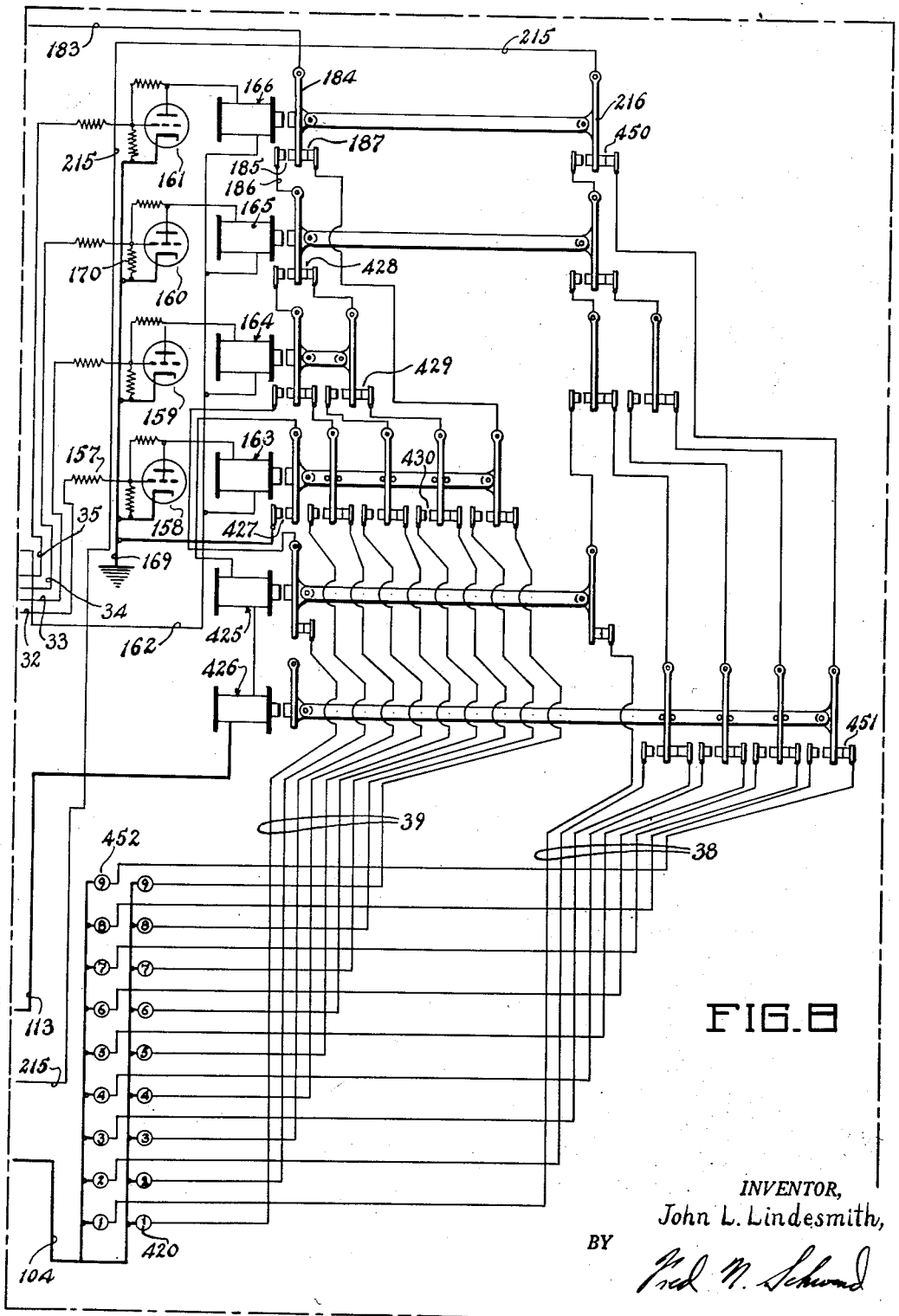

In the two lowermost denominations, the main keystems 471 rest on caps 1482 of non-ferrous metal secured to the tops of solenoid armatures 482, the latter being of a ferrous metal. Plungers 483 of non-ferrous metal are interposed between the armatures 482 and the sub-keystems 1476. The plungers are slidably mounted in bushings 484 secured to the support plate 476 by nuts 485, while the armatures 482 are slidable in the cores of solenoids 420, the circuit connections of which are indicated in Fig. 8. The windings of the latter solenoids are enclosed in tubular retainers 487 secured in place by the bushings 484.

Referring to Fig. 14, the machine is driven by a main drive shaft 490 through a cyclic clutch generally indicated at 491 from a suitable source of power (not shown).

The clutch is controlled by a clutch dog 492, pivoted at 493, and normally urged by spring 494 into its illustrated position where it maintains the clutch in disengaged condition.

Means (not shown) are provided for yieldably transmitting a drive from the shaft 490 to the various drive racks 466 so as to yieldably advance the latter until arrested by depressed ones of the keystems 476 in those orders where a key has been depressed.

The racks 466 are guided through their fore and aft movements by shafts 495 and 496 embraced by guide slots 497 and 498, respectively, in each rack.

Means (not shown) are provided to advance the shaft 495 sideways, fore and aft of the machine. The latter is yieldably connected to each rack by pairs of opposed driving pawls 499 carried by the shaft and having rollers 500 which normally engage lateral depressions formed at the closed ends of the slot 497 in the respective rack. A spring 501 urges the pawls 499 to normally hold the rollers 500 in the depressions in slots 497 until the respective rack is arrested by the zero stop 481 or by a depressed keystem.

Each rack is provided with a pair of rack gear tooth sections 502 and 503 extending on opposite sides of ordinally arranged accumulator elements or gears 504 independently and rotatably mounted on an accumulator shaft 505.

Figure 11:
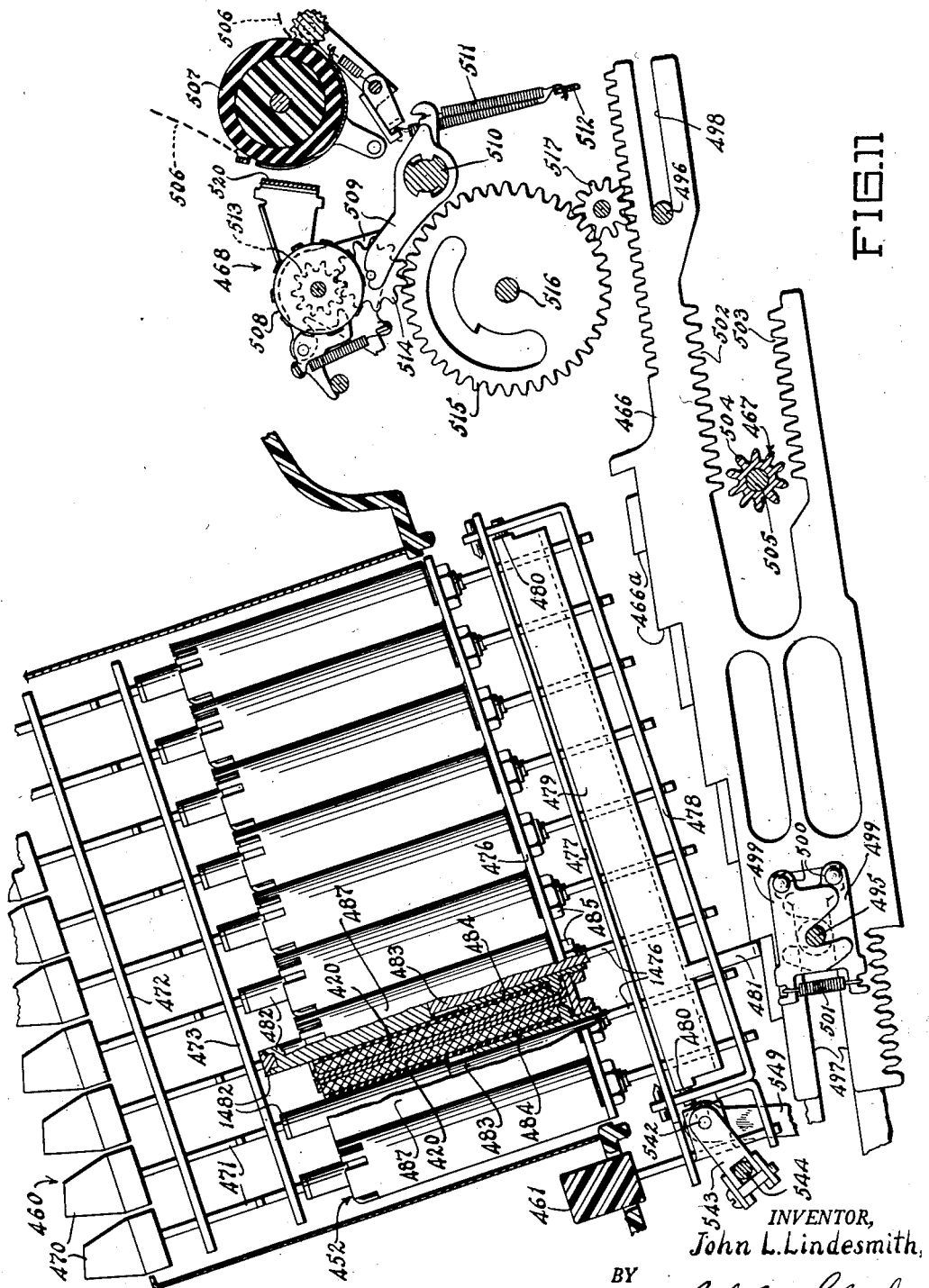
Fig. 11 is a longitudinal sectional view through the mechanical computing machine embodying a mechanical accumulator and printing instrumentalities and is taken along the line 11—11 of Fig. 12.

During additive or subtractive operations the accumulator will be raised or lowered, respectively, into mesh with the associated rack gear sections so that they will be rotated in the appropriate direction during the forward movement of the racks, while during the return of the racks, the gears 504 will be held in their neutral positions illustrated in Fig. 11.

During totaling operations, the accumulator gears 504 will be held in mesh with the lower rack gear section 503 only, while during sub-totaling operations, the accumulator gears will be held in mesh with the rack gear sections 503 during both forward and return movements of the racks.

Printer

The various values registered on the racks 466 during item entering, sub-totaling or totaling operations are printed on a paper tape 506 which is fed from a roll (not shown) around a platen 507 to a printing point at which the values are printed thereon.

The printer comprises a series of numeral printing dials 508, each associated with respective ones of the racks. Each dial has thereon a series of type ranging from zero to nine and these dials are so connected to the associated racks that they will print a digit corresponding to the value of a key depressed in the associated order or corresponding to the numerical position to which the rack is moved during its forward stroke.

17

Each dial 508 is rotatably mounted on a separate lever 509 which is loosely keyed on a printer control shaft 510 and a spring urged clockwise by a tension spring 511 extending between the arm and a machine frame part 512. A gear 513, fixed to each dial, is permanently meshed with a gear 514 also rotatably mounted on the associated printer lever 509. Except during printing operation, the levers 509 are held in their positions illustrated in Fig. 11 wherein each gear 514 meshes with an associated one of a series of idler gears 515 rotatably mounted on a support shaft 516. The latter idler gears are continuously entrained with respective ones of the drive racks 466 through a series of pinion assemblies, one of which is shown at 517.

During a printing phase of a machine cycle wherein the racks are maintained in advanced positions limited by depressed keys, the printer control shaft 510 is rocked clockwise by means not shown permitting the various springs 511 to rock the printer arms 509 and thus carry the printing dials forwardly into contact with a printing ribbon 520 to thereby print the number registered on the dials onto the paper strip 506 at the printing station.

Machine controls

Means are provided whereby depression of any of the various machine control bars either manually or automatically under control of the circuitry of the computing system will cause engagement of the clutch 491 (Fig. 14) and operation of the machine. For this purpose, the aforementioned clutch dog 492 is connected by a coupling member 520 to a clutch control bar 521. The latter is slidably supported for fore and aft movement by frame studs 522 embraced by guide slots 523 formed in the control bar. Four cam slots 524 are formed in the control bar 521 and each underlies a pin 525 carried on a lever 526 which is pivoted on a frame pin 527 and urged upwardly by a tension spring 528 to normally maintain an associated control bar in a raised position, the stem of the latter resting on the pin 525. Therefore, depression of any of the control bars 462, 463, 464 and 465 will cause its respective camming pin 525 to cam the clutch control bar 521 forwardly (to the left in Fig. 14) to rock the clutch control dog 492 counter-clockwise to effect an engagement of the clutch 491.

The clutch dog 492 is also connected to a switch control lever 529 pivoted at 530 and normally held by a tension spring 531 in a position to break the contacts of a switch generally indicated at 532 located in the power circuit of the machine motor (not shown). Thus, as the clutch dog 492 is rocked to effect engagement of the clutch, it will likewise rock the switch control lever 529 to effect closing of the contacts in switch 531 and operation of the machine.

Means are provided whereby the hereinbefore mentioned subtract entry control solenoid 25a (Figs. 7 and 15) is effective upon energization to automatically depress the subtract bar 462. For this purpose, the lever 526a associated with the subtract bar 462 is connected through a link 535 to the armature 536 of solenoid 25a, the latter being suitably supported by the machine framework through a bracket 537.

Means are likewise provided whereby the sub-total control solenoid 41 (Figs. 7 and 15) may become effective to automatically depress the sub-total bar 464. For this purpose, the lever 526b associated with the sub-total bar 464 is formed in the shape of a bell-crank and is provided with a pin 538 engageable by a lever 539, pivoted at 540, and pivotally connected to the armature 541 of the solenoid 41 which is suitably secured to the machine framework. Thus energization of the solenoid 41 will cause its armature 541 to rock the lever 539 counter-clockwise and lever 526b clockwise to cam the clutch control bar 521 forwardly.

Means are further provided whereby the add control solenoid 18a (Figs. 7 and 12) is effective upon energization to automatically cause engagement of the clutch 491 (Fig. 14) and operation of the machine. The add bar 461 is connected through a pin and slot connection 542 (Fig. 11) to an arm 543 fixed to a rock shaft 544 to which is also fastened an arm 545 (Fig. 14) having a roller 546 thereon engaging a camming surface 547 on the aforementioned clutch control bar 521. Thus, depression of the add bar 461 will cause clockwise rocking of the shaft 544 to cam the clutch control bar 521 forwardly so as to cause engagement of the clutch.

The add entry solenoid 18a which is suitably secured in a manner not shown to the machine framework has its armature 548 connected through a link 549 to the aforementioned rock shaft arm 544 so that energization of the solenoid will automatically depress the add bar 461 to effect operation of the machine.

Accumulator positioning controls

As noted hereinbefore, the accumulator is raised or lowered to mesh the accumulator gears 504 with upper or lower rack gear sections of the drive racks 466 depending on the type of operation to be performed. For this purpose, mechanism is provided under control of the different machine control bars 461 to 465 for determining and effecting positioning of the accumulator.

Referring to Fig. 15, the accumulator shaft 505 is provided with rollers on opposite ends thereof, one of which is shown at 550 embraced by a cam groove formed in a box cam 551, the latter being pivoted on a frame stud 552.

The cam 551 is normally held in illustrated neutral position by a centralizer lever 553, pivoted at 554, and urged clockwise by spring 555 to maintain a roller 556 thereon in a centralizing notch 557 formed on the lower periphery of the box cam. However, clockwise rocking of the cam 551 will lower the accumulator shaft 505 to mesh the various accumulator gears 504 with lower rack gear sections 503 of the drive racks, while counter-clockwise rocking of the cam will raise the accumulator to mesh its gears with the upper rack gear sections 502 of the racks.

The cam 551 carries a pair of pins 560 and 561 on opposite sides of its pivot 552. These pins are adapted to be selectively engaged by a hook member 563 pivotally connected to a three-arm cam follower 564. The cam follower is pivoted on the aforementioned shaft 496 and is urged counter-clockwise by a spring 565 to press a roller 566 thereon against a cam 567 keyed on the drive shaft 499. Cam 567 has a high portion about substantially half of its periphery whereby to rock the cam follower 564 and thereby move the hook 563 rearward and hold it in a rearward position during approximately the first half of the machine cycle.

Normally, during additive operations, or when the machine is at rest, the hook member 563 is held in its raised position as illustrated by a tension spring 568 to embrace the pin 560 of the cam 551 so that as the hook member is moved rearward, it will rock the cam clockwise and thereby raise the accumulator into its add entry position relative to the racks.

Means are provided for locating the hook member 563 in a lower position in coupling engagement with the pin 561 or in an intermediate position out of coupling engagement with either of the pins 560 and 561 in response to depression of certain of the control bars as will appear presently. For this purpose, a control bar 570 is provided being supported for longitudinal movement by a pair of parallel links 571 pivotally supported by frame pins 572. The bar 570 has four camming surfaces thereon, one of which is indicated at 1570, underlying the aforementioned pins 525 which are depressible by the subtract bar 462, non-add bar 463, sub-total bar 464 and total bar 465. The control bar 570 is connected by a pin and slot connection 573 to a bell-crank 574, pivoted at 575, and connected by a pin and slot connection 576 to the hook member 563.

The camming surfaces on the bar 570 are so formed that, upon depression of any one of the control bars 462, 464, and 465, the bar 570 will be moved forward its fullest extent to cause bell-crank 574 to lower the hook member 563 to engage the pin 561 so that subsequent rearward movement of the hook member will rock the cam 551 counter-clockwise to lower the accumulator into its subtract entry position. On the other hand, the camming surface associated with the non-add bar 463 is so formed that upon depression of the non-add bar, the hook member 563 will be moved to an intermediate position where it will be out of coupling engagement with both the pins 560 and 561, allowing the accumulator to remain in its neutral position during actuation of the racks 466.

During additive, subtractive and totaling operations, and after the high portion of the cam 567 has passed the roller 566, the spring 565 will become effective through cam follower 564, hook member 563 and cam 551 to return the accumulator to its neutral position before return of the racks to their home positions. However, as disclosed in detail in the aforementioned Boyden application, in sub-totaling operations, the accumulator must be held in mesh with the racks throughout both the advance and return movements of the racks in order to again be reset to its former value after the sub-total amount has been printed. Therefore, it is necessary in sub-totaling operations to maintain the accumulator in mesh with the drive racks 466 throughout the major portion of the machine cycle, and for this purpose, a second cam 590 is mounted on the shaft 490 adjacent the cam 567 and is provided with a high portion around the greater part of the periphery thereof. This latter cam engages a roller 591 on a second cam follower 592 also pivoted on shaft 496 and urged counter-clockwise by a spring 593.

A slot 594 is formed in a rearwardly extending arm of the cam follower 564 and lies coextensive with a longer slot 595 formed in the bell-crank 592. A pin 596 carried by a link 597 pivoted on the aforementioned pin 538, carried by the bell-crank 526b, rides within one or both of the slots 594 and 596 depending on the position of the link 597. When the sub-total bar 464 is in its illustrated raised position, the pin 596 will lie solely within the slot 595 and the cam 567 will therefore be solely effective to control positioning of the accumulator, allowing the same to be moved into neutral position before return of the racks in the second half of a machine cycle. However, in cases where the sub-total bar 464 is depressed, the pin 596 will be moved forwardly to locate within both of the slots 594 and 596. In this condition, i. e., during a sub-totaling operation, the two cam followers 564 and 592 will be constrained by pin 596 to move as a unit under control of the cam 590 to hold the accumulator engaged with the drive racks during both forward and return rack movements.

Means are provided whereby the aforementioned machine control switch 78 (Figs. 7 and 15) is held closed during the first portion of each machine cycle. For this purpose, the switch 78 is suitably mounted in a manner not shown on the machine framework of the machine 17 and is controlled by a switch lever 598 pivoted at 599 and urged clockwise by spring 600 tending to engage a switch plunger 601 which is effective upon depression thereof to close the switch. The switch lever 598 has an extension thereon provided with an ear 602 overlying the cam follower 564. Thus, as the cam 567 rocks the cam follower 564 clockwise at the start of a machine cycle, the spring 600 will be enabled thereby to rock the switch lever 598 to close the switch 78. As noted hereinbefore, the latter switch will be effective to suspend operation of the scan circuits until the machine has completed a considerable portion of its cycle.

As noted hereinbefore, the value 100 is entered into the computing machine 17 additively or subtractively as an incident to registration of 100 pulses in one or the other of the groups of counter units. For this purpose, the amount key in the hundreds denomination or third order to the left of the right hand order in Fig. 12 is automatically depressed upon energization of its associated solenoid 77 (Figs. 7, 12 and 13) through the hereinbefore mentioned circuit connections.

The armature 610 of solenoid 77 is connected through a link 611 to one leg of a bail 612, the legs of the latter being pivoted on the aforementioned rock shaft 544. An extension 613 of the bail 612 is interposed between the rod 474 of the "one" key in the hundreds denomination and its associated sub-keystem 1476 whereby energization of the solenoid 77 will draw the link 611 downward to rock the bail 612 clockwise and thus depress the subkeystem.

If desired, credit balance instrumentalities may be added to the machine, such as disclosed in the copending Boyden et al. application, Serial No. 151,896, filed March 25, 1950, so that the net credit balance may be indicated in cases where the number of negative pulses counted exceeds that of the positive pulses.

Although I have described my invention in detail in its preferred form and have utilized certain specific terms and languages herein, it is to be understood that the present disclosure is illustrative rather than restrictive and that changes and modifications may be made without departing from the spirit or scope of the claims appended hereto.

For example, in the foregoing disclosure, the binary counting units incorporate gaseous tubes. The latter are adequate for intermediate speed counting at rates on the order of 500 pulses per second or less. However, high vacuum tube binary counters of the flip-flop type such, for example, as disclosed in the patent to Potter, 2,538,122, issued on February 16, 1951, may be equally well adopted where higher speed counting is desired.

Also, although only two cascaded counter decades are provided for each group of counters, it will be readily seen that three or more decades may be substituted to effect a greater scaling down of the rate of counting, such additional counting decades being accompanied by associated selector and priming relays to effect sequential scanning of all such decades.

Having thus described my invention, what I desire to secure by United States Letters Patent is:

1. A computing device comprising the combination of a multi-denomination counter, means for successively actuating said counter to enter digital values thereinto, a multi-denomination accumulator, means responsive to a tens carry-over operation from a predetermined denomination only of said counter and during a counting operation of said counter for actuating a denomination of said accumulator corresponding to one denomination higher than said first predetermined denomination to enter the digit one thereinto, and selectively operable means controlled by said predetermined denomination and all lower denominations of said counter and operable after said counting operation for actuating the remaining lower denominations of said accumulator whereby to transfer amounts from said counter to said accumulator.

2. A computing device comprising a combination of a multi-denomination counter, means for successively actuating said counter to enter digit values thereinto, a multi-denomination accumulator, means controlled by said counter in response to a tens carry-over operation from the highest denomination only thereof and operable during a counting operation of said counter for actuating a denomination of said accumulator corresponding to one denomination higher than said highest denomination of said counter to enter the digit one thereinto, and selectively operable means controlled by said highest denomination and all lower denominations of said counter for thereafter actuating the remaining denominations of said accumulator, whereby to transfer amounts from said counter to said accumulator.

3. A computing device comprising the combination of a multi-denomination counter adapted to count according to a numerical system other than the decimal numerical system, means for successively actuating said counter to enter digit values thereinto, a multi-denomination accumulator adapted to accumulate according to the decimal numerical system, means controlled by said counter in response only to accumulating a number representing ten raised to a predetermined power and operable during a counting operation of said counter for actuating said accumulator to enter the digit one into the appropriate denominations of said accumulator to represent said number, and selectively operable means including a translating device controlled by said counter and operable after said counting operation for actuating the remaining denominations of said accumulator below said appropriate denomination according to the decimal numerical equivalent of the amount registered by said counter.

4. A computing device comprising the combination of first and second multi-denomination counters, means for actuating selected ones of said counters to enter digit values thereinto, a multi-denomination accumulator, means responsive to a tens carry-over operation from the highermost denomination of said first counter for additively actuating a denomination of said accumulator corresponding to one denomination higher than said highermost denomination of said first counter to add the digit one thereinto, means responsive to a tens carry-over operation from the highermost denomination of said second counter for subtractively actuating a denomination of said accumulator corresponding to one denomination higher than said highermost denomination of said second counter to subtract the digit one therefrom, and selectively operable means controlled by said first counter for thereafter additively actuating said accumulator whereby to additively transfer amounts from said first counter to said accumulator, said means being controlled by said second counter for subtractively actuating said accumulator whereby to subtractively transfer amounts from said second counter to said accumulator.

5. A computing device comprising the combination of a counter having a series of denominational stages, each stage representing a decimal denomination of a numerical system other than the decimal system, means for successively actuating said counter to enter digit values thereinto, an accumulator having a series of denominational stages, each stage representing a denomination of the decimal numerical system, means controlled by said counter in response only to accumulating a number representing ten raised to a predetermined power and operable during a counting operation of said counter for actuating the appropriate denominational stage of said accumulator to register said number, means including a translating device for translating values of said first mentioned numerical system into corresponding values of said decimal numerical system, and means operable after said counting operation for causing said last mentioned means to actuate said accumulator in accordance with values registered by said denominational stages of said counter.

6. A computing device comprising the combination of first and second multi-denomination counters, each having a series of stages, each stage representing a decimal denomination of a numerical system other than the decimal system, means for successively actuating one or the other of said counters to enter digit values thereinto, an accumulator having a series of stages, each stage representing a denomination of the decimal numerical system, means controlled by said first counter in response to accumulating a number representing ten raised to a predetermined power for additively actuating the appropriate stage of said accumulator to additively register said number, means controlled by said second counter in response to accumulating a number representing ten raised to a predetermined power for subtractively actuating the appropriate stage of said accumulator to subtractively register said last mentioned number, means including a translating device controlled by said first counter for actuating said accumulator whereby to add thereinto decimal amounts equivalent to amounts registered by said first counter, and a second means including said translating device and controlled by said second counter for actuating said accumulator whereby to subtract therefrom decimal amounts equivalent to amounts registered by said second counter.

7. A computing device comprising the combination of a counter having a plurality of denominations, means for successively actuating said counter to enter digital values thereinto, an accumulator having a plurality of denominational elements, differential actuators for respective ones of said accumulator elements, means controlled by said counter in response only to accumulation of a number representing ten raised to a predetermined power and operable during actuation of said counter for actuating the appropriate one of said accumulator elements to register said number, and scanning means operable after actuation of said counter and first selectively operable to translate an amount accumulated in one of said counter denominations and to control said differential actuators to actuate the corresponding one of said accumulator elements accordingly, said scanning means being operable thereafter to translate an amount accumulated in another said counter denominations and to control said differential actuators to actuate the corresponding ones of said accumulator elements accordingly.

8. A computing device comprising the combination of a first counter having a plurality of denominations, means for successively actuating said counter to enter digital values thereinto, a second counter having a plurality of denominations, means for successively actuating said second counter to enter digital values thereinto, an accumulator having a plurality of denominational elements, differential actuators for additively or subtractively actuating respective ones of said accumulator elements, means controlled by said first counter in response to accumulation thereof of a number representing the digit one in one of the elements of said accumulator for additively actuating said accumulator element to enter the digit one therein, means controlled by said second counter in response to accumulation of a number representing the digit one in one of the elements of said accumulator for subtractively actuating said last mentioned accumulator element to enter the digit one thereinto, a translating device for translating an amount accumulated in one of said counters and for controlling said differential actuators to actuate said accumulator accordingly, and scanning means for causing said translating device to sequentially translate the different denominations of said counters and to control said differential actuators to actuate said accumulator elements accordingly.

9. A computing system comprising the combination of a counter, means for actuating said counter to enter digital values thereinto, a storage device, means responsive to accumulation of a predetermined amount only in said counter for actuating said storage device to indefinitely store a representation of said amount therein, an accumulator, mechanism including actuators for actuating said accumulator, means controlled by said storage device upon entry of said representation of said amount therein for causing said actuating mechanism to actuate said accumulator to enter a corresponding amount therein, means controlled by said mechanism during operation of said actuators for suspending operation of said second mentioned means, and means responsive to operation of said second mentioned means for clearing said storage device.

10. A computing system comprising the combination of a counter, means for actuating said counter to enter digital values thereinto, a storage device, means responsive to accumulation of predetermined amount only in said counter for actuating said storage device to indefinitely store a representation of said amount therein, an accumulator, mechanism including actuators for actuating said accumulator, means controlled by said storage device upon entry of said representation of said amount therein for causing said mechanism to actuate said accumulator to enter an amount therein, corresponding to said predetermined amount, means controlled by said mechanism for delaying operation of said last-mentioned means during operation of said mechanism, and means controlled by said mechanism upon operation therein for clearing said storage device.

11. A computing system comprising a multi-denomination counter, means for actuating said counter to enter digital values thereinto, a storage device, means responsive to a carryover operation from the highermost denomination only of said counter for actuating said storage device to store the representation of the digit "1" indefinitely therein, an accumulator, mechanism including differential actuators for said accumulator, means controlled by said storage device upon storing said representation of said digit "1" therein for causing said actuator mechanism to actuate said accumulator to register said digit "1" therein, means controlled by said mechanism during operation thereof for delaying operation of said last-mentioned means, selectively operable means including said differential actuators operable under control of said counter for actuating said accumulator according to an amount registered by said counter, and means controlled by said mechanism for clearing said storage device.

12. A computing system comprising a multi-denomination binary counter, means for actuating said counter to enter digital values therein, a storage device, means responsive to accumulation of an amount in said counter representing the value "10" raised to a predetermined power only to cause said storage device to store a representation of said amount indefinitely therein, a multi-denomination decimal accumulator, mechanism including differential actuators for actuating said accumulator, means controlled by said storage device upon entry of said representation of said value therein for causing said actuating mechanism to enter a corresponding value in said accumulator, means including said mechanism and operable under control of said counter for actuating said accumulator to register an amount in decimal form in said accumulator equivalent to the binary amount registered in said counter, and means controlled by said mechanism to clear said storage device.

13. A computing system comprising first and second multi-denomination counters, means for actuating said counters to enter digital values thereinto, a pair of storage devices, each associated with a respective one of said counters, means responsive to accumulation of a predetermined amount in one of said counters for causing the respective one of said storage devices to store a representation of said amount therein, means responsive to accumulation of a predetermined amount in the other of said counters for causing the respective one of said storage devices to store a representation of said amount therein, a reversible accumulator adapted to additively and subtractively accumulate amounts therein, actuating mechanism for said accumulator, means normally responsive to storage of a representation of an amount in one of said storage devices for controlling said actuating mechanism to additively actuate said accumulator to additively register a corresponding amount therein, means normally responsive to storage of a representation of an amount in the other of said storage devices for controlling said actuating mechanism to subtractively actuate said accumulator to subtractively register a corresponding amount therein, and means controlled by said first mentioned storage device for suspending said other storage device from controlling said actuating mechanism during operation of said actuating mechanism under control of said first mentioned storage device.

14. A computing system comprising the combination of a pair of electronic counters, means for entering pulses to be accumulated into said counters, an accumulator, actuating mechanism for said accumulator, a pair of electronic storage devices, means controlled by one of said counters upon accumulation of a predetermined value thereby for changing one of said storage devices from one state to another, means controlled by the other of said counters upon accumulation of a predetermined value thereby for changing the other of said storage devices from one state to another, a pair of relays, each including a pair of normally closed contacts, each of said relays being connected in circuit with a respective one of said storage devices and a said contact pair operatively associated with the other of said relays, each of said storage devices being operable to energize its respective relay upon a change of said storage device from one state to the other, means controlled by one of said relays upon energization thereof for causing said actuating mechanism to additively enter an amount into said accumulator, and means controlled by the other of said relays upon energization thereof for causing said actuating mechanism to subtractively enter an amount into said accumulator.

15. A computing system comprising the combination of a pair of electronic counters, means for entering pulses to be accumulated into said counters, a pair of normally non-conducting electron tubes, each having a cathode, an anode and a control element, means including the control element of one of said tubes and responsive to one of said counters upon accumulation of a predetermined value thereby for causing conduction of said tube, means including the control element of the other of said tubes and responsive to the other of said counters upon accumulation of a predetermined value thereby for causing conduction of said other tube, a pair of relays, each including a pair of normally closed contacts, each of said relays being connected in circuit with the anode of a respective one of said tubes and with a said contact pair operatively associated with the other of said relays, each of said tubes being effective upon conduction thereof to cause energization of its respective relay when said contacts in circuit therewith are closed, a reversible accumulator, actuating mechanism for said accumulator, means controlled by one of said relays upon energization thereof for causing said actuating mechanism to additively enter a unit into said accumulator, and means controlled by the other of said relays upon energization thereof for causing said actuating mechanism to subtractively enter a unit into said accumulator.

16. A computing system comprising the combination of a pair of electronic counters, means for entering pulses to be accumulated into said counters, a pair of normally non-conducting electron tubes, each having a cathode, an anode and a control element, means controlled by one of said counters upon accumulation of a predetermined value therein for causing conduction of one of said tubes, means controlled by the other of said counters upon accumulation of said predetermined value therein for causing conduction of the other of said tubes, a pair of relays, each including a pair of normally closed contacts, each of said relays being connected in circuit with the anode of the respective one of said tubes and with a said contact pair operatively associated with the other of said relays, each of said tubes being effective upon conduction thereof to cause energization of its respective relay when said contacts in circuit therewith are closed, a reversible accumulator, actuating mechanism for said accumulator, means controlled by one of said relays upon energization thereof for causing said actuating mechanism to additively enter said predetermined value into said accumulator, means controlled by the other of said relays upon energization thereof for causing said actuating mechanism to subtractively enter said predetermined value into said accumulator, and means responsive to said actuating mechanism upon operation thereof under control of one of said electron tubes for rendering said last mentioned tube non-conductive.

17. A computing system comprising the combination of a counter including the plurality of denominational counting units; means for actuating said counter to enter digital values thereinto, an accumulator having a plurality of denominational elements, differential actuators for respective ones of said accumulator elements, electro-magnetic devices associated with different denominations of said accumulator for controlling said actuators to enter different amounts into said accumulator, an electrical data conveying system including a plurality of data buses, each of said buses being representative of a different digit, respectively, registered by a unit of said counter, relays for selecting respective ones of said counter units, each of said relays being operable to connect said data buses with a selected counter unit, means for sequentially energizing different ones of said relays, and means controlled by said last-mentioned means for connecting said data conveying system to the said electro-magnetic devices associated with a denomination of said accumulator corresponding to a selected one of said denominational counter units, a selected one of said counter units being effective to cause said data conveying system to energize one of said electro-magnetic devices corresponding in value to the value registered by said selected counter unit.

18. A computing system comprising the combination of a counter including the plurality of denominational counting units adapted to count according to a numerical system other than the decimal system; means for actuating said counter to enter digital values thereinto, a multi-denominational accumulator having a plurality of denominational elements adapted to accumulate according to the decimal numeral system, differential actuators for respective ones of said accumulator elements, electro-magnetic devices associated with different denominations of said accumulator for controlling said actuators to enter different amounts into said accumulator, an electrical data conveying system including a plurality of data buses, each of said buses being representative of a digit, respectively, in said first mentioned system, and a matrix of numerical conversion circuits connected between said buses and said electro-magnetic devices, relays for selecting respective ones of said counter units, each of said relays being operable to connect said data buses with a selected counter unit, each of said counter units when so connected applying a distinct potential to one or more of said buses in accordance with the amounts registered thereby, means for sequentially energizing different ones of said relays, said conversion circuits being effective to energize a one of said electro-magnetic devices corresponding in value to the value registered by said selected counter unit.

19. A computing system comprising the combination of a counter including the plurality of denominational counting units; means for actuating said counter to enter digital values thereinto, an accumulator having a plurality of denominational elements, differential actuators for respective ones of said accumulator elements, electromagnetic devices associated with different denominations of said accumulator for controlling said actuators to enter different amounts into said accumulator, an electrical data conveying system including a plurality of data buses, each of said buses being representative of a digit, respectively, registered by a unit of said counter, relays for selecting respective ones of said counter units, each of said relays being operable to connect said data buses with a selected counter unit, means comprising a pulsating device operable upon each successive pulsation to sequentially energize different ones of said relays, means controlled by said last-mentioned means for connecting said data conveying system to the said electro-magnetic devices associated with a denomination of said accumulator corresponding to a selected one of said denominational counter units, and means responsive to operation of said actuators for suspending operation of said pulsating device.

20. A computing system comprising the combination of a plurality of counter units, each unit representing a denomination of the decimal numerical system, each of said units including a plurality of electronic stages capable, upon reception of an operating pulse, of changing from one state to a second state, said electronic stages being connected in series whereby two changes in the state of a first said stage will change the state of a second said stage according to the binary numerical system, means for introducing operating pulses to be counted into said first stage, a plurality of data busses, means for connecting said data busses to respective stages of a selected one of said counter units, a matrix of switches, a computing device comprising a keyboard having keys arranged in accordance with the decimal numerical system, a decimal accumulator, differential actuators for said accumulator controlled by said keys, electro-magnetic devices connected to said keys, electro-magnetic devices controlled by said data busses for causing said switches to complete circuits through said first mentioned electromagnetic devices associated with a selected denomination of said keys whereby to set a said key representing the decimal equivalent of a binary amount registered by said selected counter unit, and means for concomitantly connecting said data busses to the stages of a different one of said counter units, said means being effective to connect said circuits to said first mentioned electro-magnetic devices associated with a different denomination of said keys.

21. A computing system comprising the combination of a plurality of counter units, each unit representing a denomination of the decimal numerical system, each of said units including a plurality of electronic stages capable upon reception of an operating pulse of changing from one state to a second state, said electronic stages being connected in series whereby two changes in the state of a first said stage will change the state of a second said stage according to the binary numerical system, means for introducing operating pulses to be counted into said first stage, a plurality of data busses, means for simultaneously connecting said data busses to selected stages of a selected one of said counter units, a matrix of switches, a computing device comprising a keyboard having keys arranged in accordance with the decimal numerical system, a decimal accumulator, differential actuators for said accumulator controlled by said keys, electromagnetic devices connected to said keys, electromagnetic devices controlled by said data busses for causing said switches to complete circuits through said first-mentioned electromagnetic devices associated with a selected denomination of said keys, whereby to set a said key representing the decimal equivalent of a binary amount registered by said selected counter unit, and means for connecting said data busses to the stages of a different one of said counter units and for connecting said circuit to said first-mentioned electromagnetic devices associated with a different denomination of said keys, said connections occuring concomitantly.

References Cited in the file of this patent
UNITED STATES PATENTS

| 2,318,591 | Couffignal | May 11, 1943 |
| 2,401,621 | Desch | June 4, 1946 |
| 2,432,324 | May | Dec. 9, 1947 |
| 2,486,809 | Stibitz | Nov. 1, 1949 |
| 2,523,516 | Potter | Sept. 26, 1950 |
| 2,527,567 | Munck | Oct. 31, 1950 |
| 2,540,226 | Williams | Feb. 6, 1951 |
| 2,575,331 | Compton | Nov. 20, 1951 |
| 2,595,045 | Desch | Apr. 29, 1952 |
| 2,624,507 | Phelps | Jan. 6, 1953 |
| 2,641,407 | Dickenson | June 9, 1953 |